United States Patent
Slater et al.

(10) Patent No.: US 12,297,155 B2
(45) Date of Patent: *May 13, 2025

(54) ORGANIC FLOCCULANT AND FERTILIZER

(71) Applicant: S2G Ventures Fund II, L.P., Chicago, IL (US)

(72) Inventors: Steven C. Slater, Manchester, WA (US); Mauricio Avila-Segura, Madison, WI (US); Margaret F. Phillips, McFarland, WI (US); Lisa Leilani Z. Durand, Madison, WI (US); Gary F. Zimmer, Madison, WI (US)

(73) Assignee: S2G VENTURES FUND II, L.P., Chicago, IL (US)

( * ) Notice: Subject to any disclaimer, the term of this patent is extended or adjusted under 35 U.S.C. 154(b) by 916 days.

This patent is subject to a terminal disclaimer.

(21) Appl. No.: 17/472,205

(22) Filed: Sep. 10, 2021

(65) Prior Publication Data

US 2022/0017430 A1    Jan. 20, 2022

Related U.S. Application Data

(63) Continuation of application No. 16/519,454, filed on Jul. 23, 2019, now Pat. No. 11,117,841.

(60) Provisional application No. 62/702,170, filed on Jul. 23, 2018.

(51) Int. Cl.
   C05F 17/10    (2020.01)
   C05F 17/40    (2020.01)
   C05G 5/00     (2020.01)
   C05G 5/12     (2020.01)

(52) U.S. Cl.
   CPC .............. *C05F 17/10* (2020.01); *C05F 17/40* (2020.01); *C05G 5/12* (2020.02); *C05G 5/45* (2020.02)

(58) Field of Classification Search
   CPC . C05F 17/10; C05F 17/40; C05G 5/12; C05G 5/45
   See application file for complete search history.

(56) References Cited

U.S. PATENT DOCUMENTS

| | | | |
|---|---|---|---|
| 8,313,654 B2 | 11/2012 | Piazza et al. | |
| 11,117,841 B2 * | 9/2021 | Slater | C05F 17/80 |
| 2008/0190859 A1 | 8/2008 | Stoermann | |
| 2009/0090673 A1 | 4/2009 | Jensen et al. | |
| 2009/0206028 A1 | 8/2009 | Jiang et al. | |
| 2012/0118035 A1 | 5/2012 | Zhao et al. | |

(Continued)

FOREIGN PATENT DOCUMENTS

WO    WO-2013091094 A1 *  6/2013    ......... B01D 19/0036

OTHER PUBLICATIONS

Ahlrichs et al. "Interaction of Ammonia with Vermiculite," Clay Minerals, 1972, 9:263-273.

(Continued)

*Primary Examiner* — Wayne A Langel
(74) *Attorney, Agent, or Firm* — Perkins Coie LLP

(57) ABSTRACT

Provided herein is technology relating to organic fertilizers and particularly, but not exclusively, to organic and/or biodegradable flocculants, methods of preparing organic fertilizers using an organic and/or biodegradable flocculant, and systems for treating water using an organic and/or biodegradable flocculant to prepare an organic fertilizer.

20 Claims, 9 Drawing Sheets
(9 of 9 Drawing Sheet(s) Filed in Color)
Specification includes a Sequence Listing.

(56) References Cited

U.S. PATENT DOCUMENTS

2019/0002321 A1     1/2019    Gronfors et al.
2020/0024208 A1     1/2020    Slater et al.

OTHER PUBLICATIONS

Badgley et al. "Can Organic Agriculture Feed the World?" Renewable Agriculture and Food Systems, 2007, 22(2):80-85.
Biello, David. "Will Organic Food Fail to Feed the World," Scientific American, 2012.
Burgess et al. Use of Zeolite for Removing Ammonia and Ammonia-Caused Toxicity in Marine Toxicity Identification Evaluations. Archives of Environmental Contamination and Toxicololgy, 2004. 47(4):440-447.
Essandoh et al. "Methylation of Hemoglobin to Enhance Flocculant Performance," Journal of Chemical Technology & Biotechnology, 2017. 92(8):2032-2037.
Evangelou et al. "Ammonium-Potassium-Calcium Exchange on Vermiculite and Hydroxy-aluminum Vermiculite," Soil Science Society of America Journal, 2002, 66:445-455.
Goto et al. "Ion Exchange Behavior of Ammonium Ions on Various Zeolites." Power Point Presentation.
Krishnan et al. "Polymeric Flocculants," In: Somasundaran, P., Moudgil, B. M. (Eds.), vol. 27, Surfactant Science Series, Reagents in Mineral Technology, Marcel Dekker, Inc., New York, 1998, pp. 485-518.
Lewellyn et al. "Dewatering/Filtering Aids," In: Somasundaran, P., Moudgil, B. M. (Eds.), vol. 27, Surfactant Science Series, Reagents in Mineral Technology, Marcel Dekker, Inc., New York, pp. 559-578 (1988).
Maximova et al. "Environmental Implications of Aggregation Phenomena: Current Understanding," Curent Opinion in Colloid Interface Science, 2006, 11:246-266.
Mcdowell et al. "A Review of the Policies and Implementation of Practices to Decrease Water Quality Impairment by Phosphorus in New Zealand, the UK, and the US," Nutrient Cycling in Agroecosystems, 2016, 104(3):289-305.
Nasser et al. "Effect of Polyacrylamide Polymers on Floc Size and Rheological Behaviour of Kaolinite Suspensions," Colloids and Surfaces A: Physicochemical abd Engineering Aspects, 2007, 301:311-322.
Nguyen et al. "Ammonium Removal from Wastewaters Using Natural New Zeland Zeolites," New Zealand Journal of Agricultural Research, 1998, 41:427-446.
Pal et al. "Synthesis, Characterization and Flocculation Characteristics of Cationic Glycogen: A Novel Polymeric Flocculent," Colloids and Surfaces A: Physiochemical Engineering Aspects, 2006, 289:193-199.
Pawar et al. "Alginate Derivatization: A Review of Chemistry, Properties and Applications," Biomaterials, 2012, 33:3279-3305.
Piazza et al. "Flocculation of High Purity Wheat Straw Soda Lignin," Bioresource Technology, 2014, 152:548-551.
Piazza et al. "Identification of Highly Active Flocculant Proteins in Bovine Blood.," Applied Biochemistry Biotechnology, 2012, 166(5):1203-1214.
Piazza et al. "Meat & Bone Meal Extract and Gelatin as Renewable Flocculants," Bioresource Technology, 2010, 101(2):781-787.
Piazza et al. "Proteins and Peptides as Renewable Flocculants," Bioresource Technology, 2010, 101(15):5759-5766.
Ponisio et al. "Diversification Practices Reduce Organic to Conventional Yield Gap," Proceedings of the Royal Society B: Biological Sciences, 2015. 282(1799):20141396.
Renault et al. "Chitosan for Coagulation/Flocculation Processes—An Eco-Friendly Approach," European Polymer Journal, 2009, 45:1337-1348.
Scott et al. "Ammonia-Treated Vermiculite—an Efficient Controlled-Release Nitrogenous Fertiliser for a Variety of Crops," Journal of the Science of Food and Agriculture, 1983, 34:233-238.
Seufert et al. "Comparing the Yields of Organic and Conventional Agriculture," Nature, 2012, 485(7397):229-232.
Sojka et al. "PolyAcrylamide in Agriculute and Environmental Land Management," Advances in Agronomy, 2007, 92:75-162.
Tabatabaei et al. "Importance of the Methanogenic Archaea Populations in Anaerobic Wastewater Treatments," Process Biochemistry, 2010, 45:121-25.
Vermeulen et al. "Climate Change and Food Systems," Annual Review of Environment and Resources, 2012, 37(1):195-222.
Wen et al. "Biodegradation of Polyacrylamide by Bacteria Isolated from Activated Sludge and Oil-Contaminated Soil," Journal of Hazardous Materials, 2010, 175(1-3):955-959.
Orts et al., "Biopolymer Additives to Reduce Erosion-Induced Soil Losses During Irrigation," Industrial Crops and Products, 2000, 11:19-29.
Salehizadeh et al. "Extracellular Biopolymeric Flocculants Recent Trends and Biotechnological Importance," Biotechnological Advances, 2001, 19:371-385.

\* cited by examiner

ORGANIC FLOCCULANT AND FERTILIZER

This application is a continuation application of U.S. Patent application Ser. No. 16/519,454, filed on Jul. 23, 2019, which claims priority to U.S. Provisional Patent Application Ser. No. 62/702,170, filed Jul. 23, 2018., which the entire content of the aforementioned patent applications are incorporated by reference in their entirety.

STATEMENT REGARDING FEDERALLY SPONSORED RESEARCH OR DEVELOPMENT

This invention was made with government support under Grant Nos. 2017-33610-26743 and 2018-33610-28903 awarded by the U.S. Department of Agriculture. The government has certain rights in the invention.

FIELD

Provided herein is technology relating to organic fertilizers and particularly, but not exclusively, to organic and/or biodegradable flocculants, methods of preparing organic fertilizers using an organic and/or biodegradable flocculant, and systems for treating water using an organic and/or biodegradable flocculant to prepare an organic fertilizer.

BACKGROUND

Agriculture and related industries contribute nearly 5% of the US gross domestic product, but nearly 70% of farms operate at margins below 10%, placing them at economic risk. Farming is largely a commodity business, both for producers and suppliers; margins are slim and finding additional value is critical.

One bright spot in the agricultural economy has been the growth of organic markets, regulated under the National Organic Program (NOP) (National Organic Program, in 7 CFR 205, incorporated herein by reference), which are growing at nearly four times the rate of conventional markets. Organic products are generally more profitable than conventional products, and properly-managed organic farms can be more profitable than their conventional counterparts (Ponisio, L. C., et al., Diversification practices reduce organic to conventional yield gap. Proc Biol Sci, 2015. 282(1799): p. 20141396). However, there are large obstacles to growth of the industry, including insufficient supplies of approved inputs to support organic production (Badgley, C. and I. Perfecto, Can organic agriculture feed the world? Renewable Agriculture and Food Systems. 22(2): p. 80-86; Biello, D., Will organic food fail to feed the world? Scientific American, 2012). Identifying sufficient fertilizer, particularly adequate nitrogen, is a primary concern for organic farmers.

Most organic nitrogen is supplied by fertilizing with manure (which can be transported only short distances economically), by growing leguminous crops in rotation, by adding cover crops between cash crops, or a combination of all three (Seufert, V., N. Ramankutty, and J. A. Foley, Comparing the yields of organic and conventional agriculture. Nature, 2012. 485(7397): p. 229-232). However, adequate manure is not always available at the times and places needed by growers, a problem that will worsen as more acres are put under organic practices.

Separately, many farming operations are facing significant environmental challenges. Global food production generates about ⅓ of annual greenhouse gas (GHG) emissions (Vermeulen, S. J., B. M. Campbell, and J. S. I. Ingram, Climate Change and Food Systems. Annual Review of Environment and Resources, 2012. 37(1): p. 195-222) and agriculture in the US accounts for about 9% of US GHG emissions (13). Manure management accounts for 27% of agricultural methane and 7% of agricultural nitrous oxide production annually (McDowell, R. W., et al., A review of the policies and implementation of practices to decrease water quality impairment by phosphorus in New Zealand, the UK, and the US. Nutrient Cycling in Agroecosystems, 2016. 104(3): p. 289-305). Agriculture is also a primary contributor to water pollution, particularly via nitrate and phosphorus emissions, and mitigation measures are often required.

Accordingly, improved fertilizer technologies are needed, e.g., to address organic food production and pollution concerns.

SUMMARY

Provided herein are embodiments of an organic fertilizer. In some embodiments, the organic fertilizer comprises a dried, granulated organic fertilizer. In some embodiments, the organic fertilizer is suitable for storage and transportation (e.g., allowing it to fill gaps in the N-supply chain). In some embodiments, the organic fertilizer is provided in a granular format and is thus compatible for use in conventional fertilizer application protocols (e.g., easing the transition for growers into organic practices).

Some technologies comprise converting liquid manure waste streams into a "not-quite-organic" fertilizer. In some embodiments, the technology disclosed herein provides a similar fertilizer that is NOP-compliant and thus is usable in organic agriculture. NOP-compliance adds value to the fertilizer product, increasing annual revenue. This provides a significant financial incentive to reduce the negative environmental impacts of dairies while promoting the growth of organic markets.

Accordingly, provided herein are embodiments of a technology related to a NOP-compliant polymer and/or flocculant compositions comprising a NOP-compliant polymer and/or a NOP-compliant fertilizer. In some embodiments, the NOP-compliant polymer is used as a flocculant. In some embodiments, the flocculant composition comprising the NOP-compliant polymer is used as a flocculant.

In some embodiments, the NOP-compliant polymer is alginate. In some embodiments, the flocculant composition comprises hemoglobin. In some embodiments, the flocculant composition comprises alginate. In some embodiments, the flocculant composition comprises a cation. In some embodiments, the flocculant composition comprises calcium, magnesium, potassium, and/or iron ions. In some embodiments, the flocculant composition comprises calcium ions (e.g., $Ca^{2+}$). In some embodiments, the flocculant composition comprises alginate and calcium ions (e.g., $Ca^{2+}$).

In some embodiments, the technology provides a NOP-compliant fertilizer comprising a NOP-compliant polymer flocculant, e.g., alginate.

In some embodiments, the technology provides a primer used to increase the activity of a flocculant. In some embodiments, the technology provides use of a borate as a primer to increase the activity of a flocculant.

Furthermore, provided herein are embodiments of a technology related to a biodegradable polymer and/or flocculant compositions comprising a biodegradable polymer. In some embodiments, the biodegradable polymer is used as a flocculant. In some embodiments, the biodegradable polymer is alkylated (e.g., methylated, ethylated, propylated, butylated) hemoglobin. In some embodiments, the technology provides a flocculant composition comprising alkylated (e.g., methylated, ethylated, propylated, butylated) hemoglobin. In some embodiments, the technology provides a fertilizer intermediate comprising a biodegradable polymer flocculant, e.g., alkylated (e.g., methylated, ethylated, propylated, butylated) hemoglobin. In some embodiments, the technology provides methods comprising incubating a fertilizer intermediate comprising a biodegradable polymer flocculant (e.g., alkylated (e.g., methylated, ethylated, propylated, butylated) hemoglobin). In some embodiments, methods comprise biodegrading the biodegradable polymer flocculant and producing a NOP-compliant fertilizer, e.g., a NOP-compliant fertilizer that does not comprise the biodegradable polymer flocculant (e.g., a flocculant-free NOP-compliant fertilizer).

Accordingly, provided herein is a method of recovering nutrients suspended or dissolved in a composition comprising water and said nutrients. In some embodiments, the method comprises contacting the composition with a flocculant to produce a flocculated liquid comprising floc solids; and separating said floc solids from said flocculated liquid. In some embodiments, the composition comprising water and said nutrients is waste. In some embodiments, the flocculant is an organic flocculant. In some embodiments, the flocculant is a biodegradable flocculant. In some embodiments, the method further comprises adding a coflocculant to the composition. In some embodiments, the coflocculant comprises a cation. In some embodiments, the coflocculant comprises a metal cation. In some embodiments, the coflocculant comprises an iron, magnesium, potassium, or calcium ion.

In some embodiments, the method comprises contacting the composition (e.g., ADE) with a primer (e.g., a borate) and a flocculant to produce a flocculated liquid comprising floc solids; and separating said floc solids from said flocculated liquid. In some embodiments, the composition (e.g., ADE) does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate). In some embodiments, the composition comprising water and said nutrients is waste. In some embodiments, the flocculant is an organic flocculant. In some embodiments, the organic flocculant comprises alginate. In some embodiments, the flocculant is a biodegradable flocculant. In some embodiments, the method further comprises adding a coflocculant to the composition. In some embodiments, the coflocculant comprises a cation. In some embodiments, the coflocculant comprises a metal cation. In some embodiments, the coflocculant comprises an iron, magnesium, potassium, copper, or calcium ion.

In some embodiments, the method further comprises incubating the floc solids to degrade at least 50% (e.g., at least 50, 55, 60, 65, 70, 75, 80, 85, 90, 95, or 100%) of the biodegradable flocculant. In some embodiments, the method further comprises incubating the floc solids for 1, 2, 3, 4, 5, 6, 7, 8, 9, 10, 11, 12, 13, 14, 15, 16, 17, 18, 19, or 20 or more degradation half-lives. As used herein, the term "degradation half-life" refers to the period of time in which half of the biodegradable material is degraded and half remains.

In some embodiments, the flocculant is derived from blood. In some embodiments, the flocculant comprises a polymeric carbohydrate. In some embodiments, the flocculant comprises a starch. In some embodiments, the flocculant comprises alginate. In some embodiments, the flocculant is derived from an alga.

In some embodiments, the technology provides a method of producing a fertilizer. In some embodiments, the method comprises contacting a composition (e.g., ADE) comprising water and nutrients with a flocculant to produce a flocculated liquid comprising floc solids; and separating said floc solids from said flocculated liquid to provide a fertilizer. In some embodiments, the method comprises contacting a composition comprising water and nutrients with a primer and a flocculant to produce a flocculated liquid comprising floc solids; and separating said floc solids from said flocculated liquid to provide a fertilizer. In some embodiments, the composition (e.g., ADE) does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate). In some embodiments, the composition comprising water and nutrients is waste. In some embodiments, the composition comprising water and nutrients is anaerobic digester effluent. In some embodiments, the anaerobic digester effluent comprises more that 1%, more than 2%, more than 3%, and/or more than 4% total solids. In some embodiments, the method further comprises adding a binder and/or filler to said floc solids. In some embodiments, the method further comprises dewatering said floc solids to produce a cake. In some embodiments, the method further comprises granulating said floc solids to produce a granulated fertilizer. In some embodiments, the method further comprises pelletizing said floc solids to produce a pelletized fertilizer. In some embodiments, the method further comprises incubating said floc solids to degrade said flocculant. In some embodiments, the separating step comprises providing said flocculated liquid comprising floc solids as input to a dissolved air flotation (DAF) system. In some embodiments, the separating step comprises filtering said flocculated liquid comprising floc solids.

In some embodiments, the method produces an organic fertilizer. In some embodiments, the method produces an organic fertilizer after the incubating step.

In some embodiments, the method further comprises adding a coflocculant.

In some embodiments, the flocculant comprises a polymeric carbohydrate or a starch. In some embodiments, the flocculant is derived from blood or an alga. In some embodiments, the flocculant and/or coflocculant does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate).

In some embodiments, the technology provides a method of preparing a flocculant from an alginate-producing plant. In some embodiments, the method comprises reacting material from said plant with a base to provide an alginate product. In some embodiments, the base comprises $Na_2CO_3$. In some embodiments, the base comprises approximately 2% $Na_2CO_3$ (e.g., 1.5, 1.6, 1.7, 1.8, 1.9, 2.0, 2.1, 2.2, 2.3, 2.4, or 2.5% $Na_2CO_3$). In some embodiments, the reacting step is performed at approximately 40° C. (e.g., 35, 36, 37, 38, 39, 40, 41, 42, 43, 44, or 45° C.). In some embodiments, the reacting step is performed for approximately 5 hours (e.g., 3, 4, 5, 6, 7, 8, 9, or 10 hours).

In some embodiments, the method further comprises filtering the alginate product. In some embodiments, the method further comprises washing the alginate product with ethanol. In some embodiments, the method comprises grinding the alginate-producing plant (e.g., to a mesh size of 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh)). In some embodiments, the method comprises drying the alginate-producing plant. In some embodiments, the method comprises pulverizing the alginate-producing plant.

In some embodiments, the plant is a seaweed. In some embodiments, the plant is an alga. In some embodiments, the plant is a brown alga.

In some embodiments, the method further comprises reacting said material from said plant with acid. In some embodiments, the acid comprises HCl. In some embodiments, the acid comprises approximately 2% HCl (e.g., 1.5, 1.6, 1.7, 1.8, 1.9, 2.0, 2.1, 2.2, 2.3, 2.4, or 2.5% HCl). In some embodiments, the reacting step is performed at approximately 40° C. (e.g., 35, 36, 37, 38, 39, 40, 41, 42, 43, 44, or 45° C.). In some embodiments, the reacting step is performed for approximately 5 hours (e.g., 3, 4, 5, 6, 7, 8, 9, or 10 hours).

In some embodiments, the base comprises NaOH. In some embodiments, the base comprises approximately 2% NaOH (e.g., 1.5, 1.6, 1.7, 1.8, 1.9, 2.0, 2.1, 2.2, 2.3, 2.4, or 2.5% NaOH). In some embodiments, the base comprises KOH. In some embodiments, the base comprises approximately 2% KOH (e.g., 1.5, 1.6, 1.7, 1.8, 1.9, 2.0, 2.1, 2.2, 2.3, 2.4, or 2.5% NaOH). In some embodiments, the base comprises NaOH and KOH. In some embodiments, the base comprises approximately 2% NaOH e.g., 1.5, 1.6, 1.7, 1.8, 1.9, 2.0, 2.1, 2.2, 2.3, 2.4, or 2.5% NaOH) and approximately 2% KOH e.g., 1.5, 1.6, 1.7, 1.8, 1.9, 2.0, 2.1, 2.2, 2.3, 2.4, or 2.5% KOH). In some embodiments, the reacting step is performed for approximately 24 hours (e.g., 20, 21, 22, 23, 24, 25, 26, 27, or 28 hours).

In some embodiments, the method comprises reacting material from said alginate-producing plant (e.g., an alga (e.g., a brown alga (e.g., *Laminaria digitata, Ascophyllum nodosum, Macrocystis pyrifera*, etc.))) with NaOH (e.g., 1% to 4% w/v NaOH (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0% w/v NaOH)) for a time of 8 to 16 hours (e.g., 8.0, 8.5, 9.0, 9.5, 10.0, 10.5, 11.0, 11.5, 12.0, 12.5, 13.0, 13.5, 14.0, 14.5, 15.0, 15.5, or 16.0 hours) at room temperature (e.g., 18.0, 18.5, 19.0, 19.5, 20.0, 20.5, 21.0, 21.5, 22.0, 22.5, 23.0, 23.5, 24.0, 24.5, or 25.0° C.) with stirring at approximately 100 rpm (e.g., 50-150 rpm (e.g., 50, 55, 60, 65, 70, 75, 80, 85, 90, 95, 100, 105, 110, 115, 120, 125, 130, 135, 140, 145, or 150 rpm)).

In some embodiments, the technology provides a method for producing organic floc solids from anaerobic digester effluent (ADE). For example, in some embodiments, methods comprise providing anaerobic digester effluent; adding a primer (e.g., borate) to the anaerobic digester effluent; adding a flocculant (e.g., alginate (e.g., alginate as produced by a method as described herein using NaOH (e.g., from an alginate-producing organism (e.g., a plant (e.g., a brown alga (e.g., *Laminaria digitata, Ascophyllum nodosum, Macrocystis pyrifera*, etc.))))) to the anaerobic digester effluent; and adding a cation (e.g., calcium ion) to the primed anaerobic digester effluent. In some embodiments, the anaerobic digester effluent comprises more than 1%, more than 2%, or more than 3% w/v total solids (e.g., more than 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5% w/v total solids). In some embodiments, the ADE does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate).

In some embodiments, the primer comprises boron (e.g., borate ion (e.g., sodium borate)). In some embodiments, the flocculant comprises alginate (e.g., sodium alginate)). In some embodiments, methods comprise the flocculant by a method comprising adding an alginate-producing plant to a basic solution. In some embodiments, the alginate-producing plant is a brown alga. In some embodiments, the alginate-producing plant is *Laminaria digitata, Ascophyllum nodosum*, or *Macrocystis pyrifera*. In some embodiments, the alginate comprises a preparation from a plurality of plants mixed together. In some embodiments, the basic solution comprises 1% to 4% w/v NaOH, including subranges and values therebetween. In some embodiments, the cation is $Ca^{2+}$ (e.g., provided as $CaCl_2$). In some embodiments, the primer is 0.025 to 0.25% w/v borate, including subranges and values therebetween. In some embodiments, the flocculant is 0.2 to 0.5% w/v alginate, including subranges and values therebetween. In some embodiments, the cation is 2.5% to 3.5% w/v $Ca^{2+}$, including subranges and values therebetween. In some embodiments, the cation is 500 to 30000 ppm $Ca2^+$, including subranges and values therebetween. In some embodiments, the primer (e.g., borate primer) is added at least 10 minutes before said flocculant. In some embodiments, the organic floc solids are National Organic Program (NOP)-compliant.

In some embodiments, the technology provided herein relates to a method of producing an organic fertilizer. For example, in some embodiments, methods of producing an organic fertilizer comprise producing organic floc solids from anaerobic digester effluent; separating said organic floc solids from said anaerobic digester effluent; and granulating and/or pelletizing said organic floc solids to produce an organic fertilizer. In some embodiments, producing organic floc solids from anaerobic digester effluent comprises performing a method as described herein. In some embodiments, methods of producing an organic fertilizer comprise adding a binder and/or a filler to said organic floc solids. In some embodiments, methods of producing an organic fertilizer produce an organic fertilizer that is NOP-compliant.

In some embodiments, the technology provides a fertilizer and/or a flocculant produced by a method as disclosed herein.

In some embodiments, the technology provides a fertilizer composition comprising floc solids and a polymeric carbohydrate flocculant. In some embodiments, the polymeric carbohydrate flocculant is an alginate. In some embodiments, the fertilizer further comprises calcium. In some embodiments, the fertilizer is organic. In some embodiments, the fertilizer further comprises a binder and/or filler. In some embodiments, the fertilizer is provided in a granulated or pelletized form. In some embodiments, the fertilizer further comprises borate.

In some embodiments, the technology provides a fertilizer composition intermediate comprising floc solids and a biodegradable flocculant. In some embodiments, the biodegradable flocculant is alkylated hemoglobin. In some embodiments, the fertilizer composition intermediate further comprises a binder and/or filler.

In some embodiments, the technology provides a system for producing a fertilizer. In some embodiments, the system comprises an anaerobic digester; a flocculant; and a component configured to separate floc solids from a flocculated liquid. In some embodiments, the system comprises an anaerobic digester; a primer (e.g., borate); a flocculant (e.g., alginate); and a component configured to separate floc solids from a flocculated liquid. In some embodiments, the output of the anaerobic digester (e.g., ADE) does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate). In some embodiments, the system further comprises a component configured to pelletize and/or granularize floc solids. In some embodiments, the flocculant is derived from blood, is derived from an alga, comprises a polymeric carbohydrate, or comprises a starch. In some embodiments, the flocculant comprises alginate. In some embodiments, the system further comprises a coflocculant. In some embodiments, the coflocculant comprises a cation. In some embodiments, the coflocculant comprises a metal cation. In some embodiments, the coflocculant comprises an iron, magnesium, potassium, or calcium ion. In some embodiments, the system comprises an anaerobic digester; a primer (e.g., borate); a flocculant (e.g., alginate); a coflocculant/coagulant (e.g., calcium ion); and a component configured to separate floc solids from a flocculated liquid. In some embodiments, the system further comprises a filter or screw press. In some embodiments, the system comprises an incubator. In some embodiments, the system comprises microorganisms for anaerobically digesting waste. In some embodiments, the system comprises microorganisms for biodegrading a nonorganic component of floc solids. In some embodiments, the system comprises microorganisms for biodegrading a biodegradable flocculant.

In some embodiments, the technology provides use of a method as described herein to produce a fertilizer or organic fertilizer. In some embodiments, the technology provides use of a method as described herein to produce a flocculant or organic flocculant. In some embodiments, the technology provides use of a fertilizer or organic fertilizer to provide nutrients to plants. In some embodiments, the technology provides use of a fertilizer composition intermediate as described herein to produce a fertilizer or organic fertilizer. In some embodiments, the technology provides use of a system as described herein to produce a fertilizer or organic fertilizer.

Additional embodiments will be apparent to persons skilled in the relevant art based on the teachings contained herein.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features, aspects, and advantages of the present technology will become better understood with regard to the following drawings:

FIG. 4A is a bar plot showing the calculated capture efficiency of N using a number of flocculant treatments. The horizontal line indicates the calculated capture efficiency of N using a conventional polyacrylamide flocculant (TramFloc). FIG. 4B is a bar plot showing the calculated capture efficiency of $K_2O$ using a number of flocculant treatments. The horizontal line indicates the calculated capture efficiency of $K_2O$ using a conventional polyacrylamide flocculant (TramFloc). FIG. 4C is a bar plot showing the calculated capture efficiency of total organic matter using a number of flocculant treatments. The horizontal line indicates the calculated capture efficiency of total organic matter using a conventional polyacrylamide flocculant (TramFloc).

Figure 1:
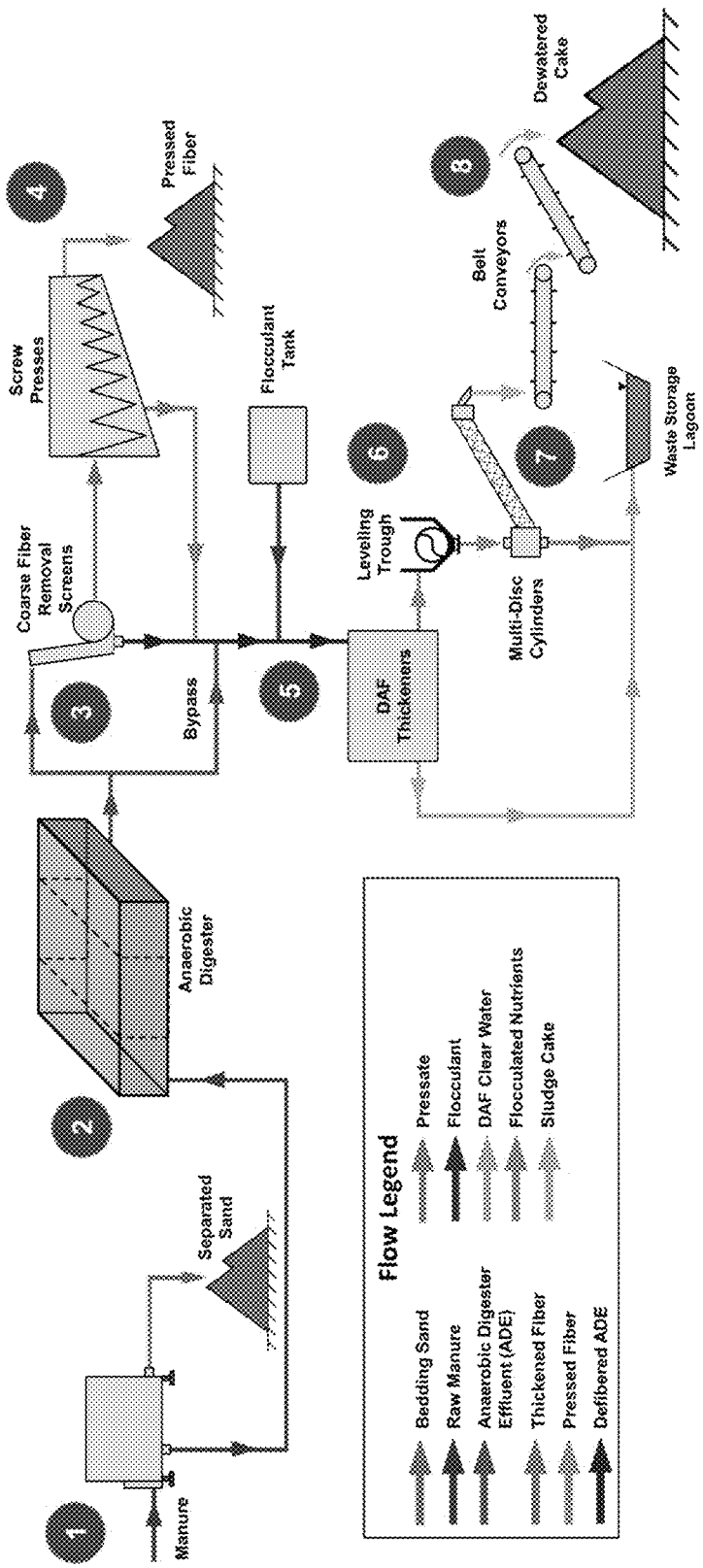
FIG. 1 is a schematic drawing showing an embodiment of a water purification system at a dairy. Some dairies bed cows on sand; accordingly, in some embodiments, water purification methods comprise separating sand (1) prior to manure entering the anaerobic digester (2). Effluent passes through screens to remove large fibrous material (3) and screw presses (4) remove large fibers. The effluent is then mixed with a flocculant (e.g., polymer) (5) to trap phosphorus and remaining solids (e.g., comprising organic nitrogen and micronutrients). The flocculated liquid enters Dissolved Air Flotation (DAF) tanks (6) where the floc solids are skimmed from the surface. Solids are dewatered (7) to produce a cake (8) that is converted to fertilizer. Water is recycled for use in the barns or irrigation.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to organic fertilizers and particularly, but not exclusively, to organic and/or biodegradable flocculants, methods of preparing organic fertilizers using an organic and/or biodegradable flocculant, and systems for treating water using an organic and/or biodegradable flocculant to prepare an organic fertilizer. In some embodiments, the technology relates to an organic fertilizer derived from anaerobic digester effluent (ADE), e.g., a fertilizer approved for use on organic farms.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

As used herein, the term "organic" when used in the context of farming, animal breeding, livestock, dairy, crops, and/or fertilizers is intended to refer to a natural source, for example, of a starting material (e.g., an anaerobic digester effluent), intermediate (e.g., in some embodiments, a fertilizer intermediate), and/or final product (e.g., an organic fertilizer). While not intended to be limiting, an organic material for an organic fertilizer can comprise plant and/or animal byproducts, rock powder, seaweed, inoculants, conditioners, dairy product waste, livestock manure, liquid manure, worm castings, peat, guano, compost, blood meal, bone meal, fish meal, decomposing crop residue, cheese whey, mixed liquor from food and/or livestock processing facilities, wastewater from food processing operations, waste from an animal, waste from a dairy farm, anaerobic digester effluent, and any combination thereof. In another aspect, any naturally sourced material that can provide nitrogen, phosphate, and/or potash can be, for example, a starting material for an organic fertilizer product. One of ordinary skill in the art understands that standards for assessing and/or certifying a composition as "organic" may change from time to time. In case of ambiguity, in some embodiments, the term "organic" refers to a composition complying with one or more national or international standards developed for organic compositions, e.g., one of the following:

In some embodiments, the term "organic" refers to a composition complying with the National Organic Program (NOP) and/or the regulations developed in the US pursuant to The Organic Foods Production Act of 1990 as published in the Federal Register (e.g., 65 FR 80548 (Dec. 21, 2000)) and subsequently codified in 7 C.F.R. 205, which is incorporated herein by reference.

In some embodiments, "organic" refers to a composition complying with international standards under international organic equivalency agreements (e.g., with Canada (2009), the European Union (2012), and Japan and Korea (2014)). In some embodiments, the term "organic" refers to a composition complying with European Union regulation No. 2092/91 of the European Council (Jun. 24, 1991), which is incorporated herein by reference. In some embodiments, the term "organic" refers to a composition complying with European Union regulation No. 2092/91 of the European Council (Jun. 24, 1991) as supplemented by regulation (EC) No. 1804/1999 (1999), incorporated herein by reference, which regulates the raising, labelling, and inspection of animal (e.g., cattle, sheep, goats, horses, and poultry). In some embodiments, the term "organic" refers to a composition complying with European Union regulation No. 834/2007, incorporated herein by reference, which replaces the 2092/91 regulation (Jun. 28, 2007). EU regulation No. 889/2008 supplements the breeding of animal species; EU regulation No. 1235/2008 regulates the import of ecologically grown agricultural products from third countries, each of which is incorporated herein by reference.

In some embodiments, the term "organic" refers to a composition in compliance with a standard certified by the International Federation of Organic Agriculture Movements (IFOAM)—Organics International.

In some embodiments, the term "organic" includes genetically modified organisms and, in some embodiments, the term "organic" excludes genetically modified organisms.

In some embodiments, the term "organic" refers to a system, method, apparatus, kit, and/or device used to produce an organic material (e.g., a fertilizer).

As used herein, the term "non-organic" when used in the context of farming, animal breeding, livestock, dairy, crops, and/or fertilizers refers to a composition that comprises at least one component that does not qualify as "organic".

As used herein, the term "organic" when used in the context of a molecule, chemical, compound, or biochemical substance refers to a molecule, chemical, compound, or biochemical substance comprising at least one carbon atom.

As used herein, the term "animal waste" or "animal manure solids" is intended to refer to manure solids that are present in a composition or an animal waste slurry that contains manure. Solids content refers to the amount of solids present in a composition that remain after water has been removed or allowed to evaporate. In one aspect, "animal waste" can refer to chicken manure. In other aspects, "animal waste" can refer to waste from other animals, such as, for example, hogs, turkey, or other animals not specifically recited herein. In yet another aspect, "animal waste" can refer to a mixture of waste products from two or more types of animals.

As used herein, the term "anaerobic digester effluent" or "ADE" refers to the output of an anaerobic digester. In some embodiments, the output from an anaerobic digestion system comprises water (e.g., originating from moisture present in the input waste and/or water produced during microbial biodegradation of the input waste) and nutrients (e.g., organic compounds, inorganic compounds (e.g., minerals)).

As used herein, the term "nutrients" refers to any combination of materials comprising nitrogen, carbon, phosphorus, potassium, calcium, magnesium, sulfur, boron, chlorine, cobalt, copper, iron, manganese, molybdenum, sodium, nickel, or zinc.

As used herein, the term "coagulant" refers to a material added to alter electric charges of dissolved and suspended species. In some embodiments, an exemplary coagulant includes but is not limited to aluminum and ferric compounds.

As used herein, the term "coagulation" refers to a process comprising destabilizing suspended solids by adding salts to reduce to neutralize the electrical repulsion between particles and thus promote the particles to aggregate. In some embodiments, coagulation is a chemical process and is pH dependent.

As used herein, the term "coagulant aid" refers to a polyelectrolyte added to enhance the flocculating activity of a flocculant and/or coagulant.

As used herein, the term "coflocculant" refers to a substance that improves the flocculant activity of a flocculant and/or is necessary for a flocculant to have sufficient flocculant activity.

As used herein, the term "flocculation" refers to the activity of polymeric materials to promote the aggregation of individual particles in solution, e.g., by reacting (e.g., covalently or electrostatically) with the particles, adsorption, or co-aggregating with the particles.

As used herein, the term "flocculant" refers to a material that promotes the aggregation and clumping of dissolved or suspended particles without using charge neutralization.

As used herein, the term "flocculent" or "floc" refers to the nutrients captured by a flocculant, e.g., in large cohesive aggregates.

As used herein, the term "fertilizer" refers to a material that provides a nutrient to a plant.

As used herein, the term "fertilizer intermediate" refers to a material that is processed to produce a fertilizer. In some embodiments, a fertilizer intermediate is non-organic (e.g., comprises a non-organic flocculant) and is processed (e.g., by incubating) to remove (e.g., by microbial biodegradation of) at least a portion of the non-organic flocculant to produce a fertilizer (e.g., an organic fertilizer).

As used herein, the term "binder" refers to a substance added to assist with physical characteristics of agglomerated or granulated materials.

As used herein, the term "filler" refers to a substance added to assist with the physical characteristics of agglomerated or granulated materials.

As used herein, the term "polymeric carbohydrate" refers to a molecule comprising long chains of repeating units, e.g., often including but not limited to units comprising carbon, hydrogen, and oxygen atoms.

As used herein, the terms "protein" and "polypeptide" refer to compounds comprising amino acids joined via peptide bonds and are used interchangeably. A "protein" or "polypeptide" encoded by a gene is not limited to the amino acid sequence encoded by the gene, but includes post-translational modifications of the protein. Where the term "amino acid sequence" is recited herein to refer to an amino acid sequence of a protein molecule, "amino acid sequence" and like terms such as "polypeptide" or "protein" are not meant to limit the amino acid sequence to the complete, native amino acid sequence associated with the recited protein molecule. Furthermore, an "amino acid sequence" can be deduced from the nucleic acid sequence encoding the protein.

Conventional one and three-letter amino acid codes are used herein as follows—Alanine: Ala, A; Arginine: Arg, R; Asparagine: Asn, N; Aspartate: Asp, D; Cysteine: Cys, C; Glutamate: Glu, E; Glutamine: Gln, Q; Glycine: Gly, G; Histidine: His, H; Isoleucine: Ile, I; Leucine: Leu, L; Lysine: Lys, K; Methionine: Met, M; Phenylalanine: Phe, F; Proline: Pro, P; Serine: Ser, S; Threonine: Thr, T; Tryptophan: Trp, W; Tyrosine: Tyr, Y; Valine: Val, V. As used herein, the codes Xaa and X refer to any amino acid.

As used herein, the terms "variant" (e.g., substituted variant) and "mutant" when used in reference to a polypeptide refer to an amino acid sequence that differs by one or more amino acids from another, usually related polypeptide. The variant may have "conservative" changes, wherein a substituted amino acid has similar structural or chemical properties. One type of conservative amino acid substitutions refers to the interchangeability of residues having similar side chains. For example, a group of amino acids having aliphatic side chains is glycine, alanine, valine, leucine, and isoleucine; a group of amino acids having aliphatic-hydroxyl side chains is serine and threonine; a group of amino acids having amide-containing side chains is asparagine and glutamine; a group of amino acids having aromatic side chains is phenylalanine, tyrosine, and tryptophan; a group of amino acids having basic side chains is lysine, arginine, and histidine; and a group of amino acids having sulfur-containing side chains is cysteine and methionine. Preferred conservative amino acids substitution groups are: valine-leucine-isoleucine, phenylalanine-tyrosine, lysine-arginine, alanine-valine, and asparagine-glutamine. More rarely, a variant may have "non-conservative" changes (e.g., replacement of a glycine with a tryptophan). Similar minor variations may also include amino acid deletions or insertions (e.g., additions), or both. Guidance in determining which and how many amino acid residues may be substituted, inserted or deleted may be found using computer programs well known in the art, for example, DNAStar software.

As used herein, the terms "alkyl" and the prefix "alk-" are inclusive of both straight chain and branched chain saturated or unsaturated groups, and of cyclic groups, e.g., cycloalkyl and cycloalkenyl groups. Unless otherwise specified, acyclic alkyl groups are from 1 to 6 carbons (e.g., methyl, ethyl, propyl, butyl, pentyl, and hexyl). Cyclic groups can be monocyclic or polycyclic and preferably have from 3 to 8 ring carbon atoms. Exemplary cyclic groups include cyclopropyl, cyclopentyl, cyclohexyl, and adamantyl groups. Alkyl groups may be substituted with one or more substituents or unsubstituted. Exemplary substituents include alkoxy, aryloxy, sulfhydryl, alkylthio, arylthio, halogen, alkylsilyl, hydroxyl, fluoroalkyl, perfluoroalkyl, amino, aminoalkyl, disubstituted amino, quaternary amino, hydroxyalkyl, carboxyalkyl, and carboxyl groups. When the prefix "alk" is used, the number of carbons contained in the alkyl chain is given by the range that directly precedes this term, with the number of carbons contained in the remainder of the group that includes this prefix defined elsewhere herein. For example, the term "C1-C4 alkaryl" exemplifies an aryl group of from 6 to 18 carbons (e.g., see below) attached to an alkyl group of from 1 to 4 carbons.

As used herein, the term "alginate" refers also to alginic acid. Alginates are the salts of alginic acid that provide the structural components of brown seaweed. In some embodiments, alginate is an unbranched binary copolymer comprising (1,4)-linked β-d-mannuronic acid and α-l-guluronic acid. Alginic acids are found naturally in the cell wall components of brown seaweeds as the calcium salt of alginic acid, and are biosynthesized through various pathways by two bacterial genera, *Pseudomonas* and *Azotobacter*. Alginic acid is commercially extracted from alginates (e.g., sodium, potassium, calcium, or magnesium alginate), e.g., found in brown seaweed species. Major sources include *Ascophyllum* (North Atlantic), *Laminaria* and *Saccharina* (various northern hemisphere oceans) and *Macrocystis* (California and Mexico), with lesser sources from *Lessonia* (South America), *Durvilea* (Australia), *Ecklonia* (South Africa), *Sargassum*, and *Turbinaria*.

Description

Provided herein is technology relating to organic fertilizers and particularly, but not exclusively, to organic and/or biodegradable flocculants, methods of preparing organic fertilizers using an organic and/or biodegradable flocculant, and systems for treating water using an organic and/or biodegradable flocculant to prepare an organic fertilizer.

Livestock manure constitutes a primary source of nutrients contributing to watershed eutrophication and mitigation is a major challenge. Cow manure is, by regulatory definition, organic (7 CFR § 205). Thus, manure provides a base on which to build an organic fertilizer. Dairies and other animal producers have installed anaerobic digesters (ADs) that help breakdown animal waste, reducing dry matter weight, and generating methane for energy production. However, the effluent from these systems contains all the non-carbon nutrients that went into the system as well as water that is part of the digestion process. Accordingly, provided herein is a technology for collecting nutrients and solids from anaerobic digester effluent (ADE) and formulating them with additional organic nutrients to produce a fertilizer that can support organic producers. In some embodiments, the technology further comprises granulating the fertilizer. In the process, nutrients are removed from AD wastewater and recycled into crop production, and water pollution is reduced. Although the disclosure herein refers to certain illustrated embodiments, it is to be understood that these embodiments are presented by way of example and not by way of limitation.

Fertilizer and Anaerobic Digester System and Methods

In some embodiments, the technology is associated with a fertilizer plant comprising water treatment and anaerobic digester (AD) facilities (see, e.g., FIG. 1). In some embodiments, fertilizer is produced from cake produced by this system. In some embodiments, the process produces four products: 1) sand (e.g., that is recycled for bedding in the barns); 2) pressed fiber (e.g., that is sold or composted and then sold (e.g., to potting mix producers)); 3) waste water (e.g., that is recycled (e.g., for washing the barns, for irrigation, etc.); and 4) dewatered cake comprising fine solids and nutrients trapped by flocculation.

In some embodiments, the technology provides a dewatered cake comprising nutrients, e.g., for use as a fertilizer and/or to produce a composition comprising a fertilizer. In some embodiments, the technology provides an improved fertilizer in which the concentration of nutrients in the dewatered cake is maximized. In some embodiments, nutrients are added to a fertilizer composition produced from a dewatered cake to produce a fertilizer. Accordingly, in some embodiments, the amount of nutrients added to a fertilizer composition produced from a dewatered cake is determined by the efficiency of nutrient capture from the digester effluent and/or the final target formulation of the fertilizer. Furthermore, efficient removal of nutrients from the water provides cleaner water, reduced watershed emissions, and an improved greenhouse gas profile because nitrogen is captured and recycled.

Table 1 shows the makeup of the influent and the current rates of nutrient capture using an embodiment of the technology.

0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate).

In some embodiments, approximately 80% or more (e.g., approximately 70, 75, 80, 85, 90, 95, 97, 98, 99, or 100%) of the phosphorus, approximately 70% or more (e.g., approximately 60, 65, 70, 75, 80, 85, 90, 95, 97, 98, 99, or 100%) of the organic nitrogen, and most (e.g., approximately 90, 95, 98, 99, or 100%) of the micronutrients are captured from the ADE. Table 1 provides the calculated rates of nutrient capture for two NOP-compliant process flocculants and the calculated rate of nutrient capture for a conventional polyacrylamide flocculant.

In some embodiments, coarse solids are separated from the ADE (e.g., prior to further treatment). In some embodiments, coarse solids are separated from ADE using a defibering step, e.g., comprising passing ADE through a rotary drum screen separator. In some embodiments, coarse solids are collected from the screen separator via a screw press for other uses, while the remaining liquid ADE comprising fine solids is used for further treatment (e.g., treated by adding a primer (e.g., borate (e.g., sodium borate)) in a priming step and/or treated by adding a flocculant (e.g., alginate (e.g., sodium alginate)) in a flocculating step.

TABLE 1

Mass Balance of Water Purification

| Component | Influent Tons of Nutrients/Day (actual) | Percent Nutrients Captured | | |
|---|---|---|---|---|
| | | Current Flocculant @ 20-25 ppm (actual) | Sodium Alginate with CaCl$_2$ (estimated) | Methylated Hemoglobin (estimated) |
| N, Total | 5.36 | 39% | 23-44% | 14-49% |
| N, Ammonium | 3.31 | 12% | 20-30% | 11-36% |
| N, Organic | 2.03 | 72% | 24-57% | 17-61% |
| P$_2$O$_5$ | 2.07 | 80% | unk. | unk. |
| K$_2$O | 4.45 | 18% | 20-28% | 11-35% |
| S | 0.52 | 71% | 100% | unk. |
| Mg | 1.71 | 47% | 32-54% | 13-42% |
| Ca | 2.99 | 80% | 28-36% | 20-75% |
| Na | 1.98 | 13% | 19-28% | 10-33% |
| Al | 0.11 | 100% | unk. | unk. |
| Cn | 0.04 | 100% | 100% | unk. |
| Fe | 0.22 | 89% | 100% | unk. |
| Mn | 0.04 | 100% | 100% | unk. |
| Zn | 0.07 | 100% | 100% | unk. |

The values provided in Table 1 indicate the removal of coarse fiber material and are based on dry weights. Phosphorus and potassium are calculated as P$_2$O$_5$ and K$_2$O equivalents, respectively, as this is the fertilizer-industry standard for these nutrients. Unk = unknown.

In some embodiments, the AD produces approximately multiple hundreds of thousands to multiple millions of gallons of effluent per day containing multiple tons of nitrogen (N), phosphorus (P), and potassium (K) (NPK). This AD effluent (ADE) is physically processed to remove the large fiber fraction, yielding multiple hundreds of thousands to multiple millions of gallons of source material (influent) for the flocculation and nutrient capture process. In a particular embodiment, the AD produces approximately 733,000 gallons of effluent per day containing 10 tons of NPK. In some embodiments, the ADE is processed to yield approximately 720,000 gallons of influent for the flocculation and nutrient capture process. In some embodiments, the ADE does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, Flocculants A flocculant is a substance that causes suspended particles to aggregate and form discrete flocs (see, e.g., Krishnan and Attia, Polymeric flocculants, In: Somasundaran, P., Moudgil, B. M. (Eds.), Vol. 27, Surfactant Science Series, Reagents in Mineral Technology, Marcel Dekker, Inc., New York, pp. 485-518 (1988), incorporated herein by reference). Aggregation of the fine particles usually results in accelerated sedimentation to give a clarified solution. Many flocculants are polymeric, and they are used in a wide variety of processes such as wastewater clarification (Maximova and Dahl, Curr. Opin. Colloid Int. Sci., 11: 246-266 (2006), incorporated herein by reference), paper manufacture, concentration during chemical operations, and dewatering and thickening in mineral operations (Swarovsky, Solid-liquid separation, 4th edition, Butterworth-Heinemann, Oxford, p. 126, incorporated herein by reference). They are also used as filtration and centrifugation aids (Lewellyn and Avotins, Dewatering/filtering aids, In: Somasundaran, P., Moudgil, B.

M. (Eds.), Vol. 27, Surfactant Science Series, Reagents in Mineral Technology, Marcel Dekker, Inc., New York, pp. 559-578 (1988), incorporated herein by reference).

A widely used conventional flocculant is anionic polyacrylamide (PAM), which has a high effectiveness and low toxicity to aquatic life (Nasser and James, Effect of polyacrylamide polymers on floc size and rheological behaviour of kaolinite suspensions, Colloids and Surfaces A: Physicochem. Eng. Aspects, 301: 311-322 (2007), incorporated herein by reference). PAM is also applied directly to soil to prevent erosion in agricultural and construction areas (Sojka et al., Advances in Agronomy, 92: 75-162 (2007), incorporated herein by reference).

Other flocculants include derivatives of amylopectin, carboxymethylcellulose, guar gum, starch, and glycogen (Pal et al., Colloids and Surfaces A: Physiochem. Eng. Aspects, 289: 193-199 (2006), incorporated herein by reference). Derivatives of chitosan have been examined as coagulation/flocculation aids in waste water treatment (Renault, F., et al., Eur. Polym. J., 45: 1337-1348 (2009), incorporated herein by reference). Extracellular biopolymeric materials from microorganism fermentation have recently been investigated as a new source of renewable flocculants (Salehizadeh and Shojaosadati, Biotech. Adv., 19: 371-385. (2001), incorporated herein by reference). Additionally, suspensions of chitosan, starch xanthate, cellulose xanthate, and acid-hydrolyzed cellulose microfibrils have been tested for control of soil sediment runoff (Orts, W. J., et al., Industrial Crops and Products, 11: 19-29 (2000), incorporated herein by reference). Known renewable flocculants and erosion control agents generally must be used at significantly higher concentrations than PAM to achieve equivalent results.

In some embodiments, the technology provides a flocculant. In some embodiments, the technology provides a composition comprising a flocculant. In some embodiments, the flocculant is organic. In some embodiments, the flocculant is biodegradable (e.g., in some embodiments the flocculant is degraded by a microbe and/or plurality of microbes (e.g., microbes present in ADE and/or by microbes added to ADE, a fertilizer intermediate, and/or a fertilizer to degrade the flocculant)). In some embodiments, the flocculant is organic and biodegradable.

In some embodiments, the flocculant is, is derived from, is isolated from, and/or comprises alkylated (e.g., methylated, ethylated, propylated, butylated) hemoglobin; whole blood (e.g., from chicken); alginic acid; calcium alginate; carrageenan (e.g., iota carrageenan); powdered *Ascophyllum nodosum*, potassium (e.g., having an NPK of 0-0-16 (e.g., available as GROWER'S SECRET seaweed powder)); giant brown seaweed (e.g., *Ecklonia maxima* (e.g., MIDWESTERN BIOAG KELPAK liquid seaweed concentrate)); kelp; kelp powder; Atlantic kombu (e.g., *Laminaria digitata*) alginate extract; brown algae, red algae, green algae, polygalacturonic acid; sodium alginate; starch (e.g., LIFELINE 5305 starch); polymeric carbohydrate; iron (II) sulfate; iron (III) sulfate; and/or polymerized iron sulfate. In some embodiments, the flocculant comprises a cation (e.g., $Fe^{2+}$, $Mg^{2+}$, $K^+$, $Ca^{2+}$).

In some embodiments, the flocculant is a polysaccharide. In some embodiments, the flocculant is negatively charged. In some embodiments, the flocculant is a linear copolymer (e.g., comprising homopolymeric blocks of (1-4)-linked β-D-mannuronate and α-L-guluronate respectively, covalently linked in different sequences and/or blocks). In some embodiments, the flocculant is used at a concentration of approximately 200-400 ppm (e.g., 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, or 450 ppm). In some embodiments, the flocculant is used at a concentration of approximately 2000-4000 ppm (e.g., 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, or 4500 ppm). In some embodiments, the flocculant is used at a concentration of approximately 0.2 to 0.4% w/v (e.g., 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40% w/v).

For example, in some embodiments, the flocculant is and/or comprises alginate, also known as alginic acid or algin. In some embodiments, the flocculant comprises alginate and calcium. In some embodiments, the flocculant is and/or comprises sodium alginate, potassium alginate, and/or calcium alginate. In some embodiments, alginate is derived from seaweed (e.g., in a NOP-compliant manner). In some embodiments, the flocculant (e.g., alginate) is derived from brown seaweed. In some embodiments, the flocculant (e.g., alginate) is derived from a brown seaweed of the class Phaeophyceae. In some embodiments, the flocculant (e.g., alginate) is derived from kombu, e.g., Atlantic kombu (e.g., *Laminaria* species (e.g., *Laminaria digitata*, *Laminaria japonica*)), kelp (e.g., *Macrocystis* species (e.g., *Macrocystis pyrifera*)), or *Ascophyllum* species (e.g., *Ascophyllum nodosum*). In some embodiments, the flocculant (e.g., alginate) is derived from aria (e.g., wakame). In some embodiments, the flocculant (e.g., alginate) is derived from dulse. In some embodiments, the flocculant is derived from *Saccharina lattisima*. In some embodiments, the flocculant is derived from *Dashi kombu*.

In some embodiments, the flocculant (e.g., alginate) is derived from a microbial (e.g., bacterial, archaeal, and/or microbial eukaryotic) source. In some embodiments, the flocculant is produced by a recombinant microorganism (e.g., comprising enzymes and/or comprising nucleic acids encoding enzymes for production of an alginate or similar polysaccharide).

In some embodiments, the flocculant (e.g., alginate) is derived from a microbe isolated from nature; in some embodiments, the flocculant is derived from a recombinant microbe comprising a heterologous nucleic acid. In some embodiments, the flocculant (e.g., alginate) is derived from a bacterium of the genus *Pseudomonas* or *Azotobacter*. See, e.g., Remminghorst and Rehm "Microbial Production of Alginate: Biosynthesis and Applications" in *Microbial Production of Biopolymers and Polymer Precursors: Applications and Perspectives* (Caister Academic Press, Bernd H. A. Rehm (ed.), 2009), incorporated herein by reference.

In some embodiments, the flocculant is derived from an alga. In some embodiments, the flocculant is from a red alga, a brown alga, or a green alga. In some embodiments, the flocculant is derived from an alga from the taxonomic classification Rhodoplantae (e.g., red algae), Phaeophyceae (e.g., brown algae), Chlorophyta (e.g., green algae), and/or Charophyta (e.g., green algae).

In some embodiments, alginate is used as a flocculant at a concentration of approximately 200-400 ppm (e.g., 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, or 450 ppm). In some embodiments, alginate is used at a concentration of approximately 2000-4000 ppm (e.g., 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, or 4500 ppm). In some embodiments, alginate is used at a concentration of approximately 0.2 to 0.4% w/v (e.g., 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40% w/v).

In some embodiments, alginate is produced by a method comprising drying and pulverizing seaweed to provide a seaweed powder; treating the seaweed powder with acid (e.g., hydrochloric acid (e.g., 0.1 N HCl (e.g., 0.07, 0.08, 0.09, 0.1, 0.11, 0.12, or 0.13 N HCl))), e.g., for approximately 24 hours (e.g., 20, 21, 22, 23, 24, 25, 26, 27, or 28 hours), to produce an acidified seaweed powder; and treating the acidified seaweed powder with a base (e.g., $Na_2CO_3$ (e.g., 2% $Na_2CO_3$ (e.g., 1.5, 1.6, 1.7, 1.8, 1.9, 2.0, 2.1, 2.2, 2.3, 2.4, or 2.5% $Na_2CO_3$))), e.g., for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.), to provide a neutralized seaweed powder. In some embodiments, methods further comprise filtering the neutralized seaweed powder to provide a filtered seaweed powder. In some embodiments, methods further comprise washing the filtered seaweed powder with ethanol (e.g., an equal volume of ethanol) to provide an alginate.

In some embodiments, alginate is produced by a method comprising drying and pulverizing seaweed to provide a seaweed powder; and treating the acidified seaweed powder with a base (e.g., $Na_2CO_3$ (e.g., 2% $Na_2CO_3$ (e.g., 1.5, 1.6, 1.7, 1.8, 1.9, 2.0, 2.1, 2.2, 2.3, 2.4, or 2.5% $Na_2CO_3$))), e.g., for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.), to provide a neutralized seaweed powder. In some embodiments, methods further comprise filtering the neutralized seaweed powder to provide a filtered seaweed powder. In some embodiments, methods further comprise washing the filtered seaweed powder with ethanol (e.g., an equal volume of ethanol) to provide an alginate).

In some embodiments, alginate is produced by a method comprising drying and pulverizing seaweed to provide a seaweed powder; and treating the seaweed powder with base (e.g., NaOH (e.g., 2% NaOH (e.g., 1.5, 1.6, 1.7, 1.8, 1.9, 2.0, 2.1, 2.2, 2.3, 2.4, or 2.5% NaOH))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, alginate is produced by a method comprising drying and pulverizing seaweed to provide a seaweed powder; and treating the seaweed powder with base (e.g., KOH (e.g., 2% KOH (e.g., 1.5, 1.6, 1.7, 1.8, 1.9, 2.0, 2.1, 2.2, 2.3, 2.4, or 2.5% KOH))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, alginate is produced by a method comprising drying and pulverizing seaweed to provide a seaweed powder; and treating the seaweed powder with base (e.g., NaOH/KOH (e.g., 2% NaOH/2% KOH (e.g., (e.g., 1.5, 1.6, 1.7, 1.8, 1.9, 2.0, 2.1, 2.2, 2.3, 2.4, or 2.5% NaOH and 1.5, 1.6, 1.7, 1.8, 1.9, 2.0, 2.1, 2.2, 2.3, 2.4, or 2.5% KOH)))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, alginate is produced by a method comprising drying and grinding an alginate-producing plant (e.g., seaweed (e.g., an alga (e.g., a brown alga (e.g., *Laminaria digitata*, *Ascophyllum nodosum*, *Macrocystis pyrifera*, etc.)))). In some embodiments, grinding the alginate-producing plant comprises using a combination of electric grinders and/or mortar and pestle. In some embodiments, methods comprise grinding the alginate-producing plant to a size of approximately 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh). In some embodiments, the ground alginate-producing plant is screened using sieves of various mesh sizes (e.g., 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh)) to obtain an appropriate particle (e.g., mesh) size and/or amount of ground alginate-producing plant for preparing alginate. In some embodiments, methods comprise reacting the ground alginate-producing plant (e.g., an alga (e.g., a brown alga (e.g., *Laminaria digitata*, *Ascophyllum nodosum*, *Macrocystis pyrifera*, etc.))) with NaOH (e.g., 1% to 4% w/v NaOH (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0% w/v NaOH)) for a time of 8 to 16 hours (e.g., 8.0, 8.5, 9.0, 9.5, 10.0, 10.5, 11.0, 11.5, 12.0, 12.5, 13.0, 13.5, 14.0, 14.5, 15.0, 15.5, or 16.0 hours) at room temperature (e.g., 18.0, 18.5, 19.0, 19.5, 20.0, 20.5, 21.0, 21.5, 22.0, 22.5, 23.0, 23.5, 24.0, 24.5, or 25.0° C.) with stirring at approximately 100 rpm (e.g., 50-150 rpm (e.g., 50, 55, 60, 65, 70, 75, 80, 85, 90, 95, 100, 105, 110, 115, 120, 125, 130, 135, 140, 145, or 150 rpm)).

In some embodiments, the flocculant is a protein. In some embodiments, the flocculant is a protein comprising a cofactor (e.g., a porphyrin (e.g., comprising an iron)). In some embodiments, the flocculant is a protein derived from blood. Under some conditions, blood derived substances have flocculant activity similar to polyacrylamide (PAM). For instance, hemoglobin has been shown to flocculate kaolin or lignin suspensions (see, e.g., U.S. Pat. No. 8,313,654, incorporated herein by reference). During the development of embodiments of the technology provided herein, experiments were conducted to test native hemoglobin as a flocculant for fertilizer production, e.g., according to the methods described herein. The data indicated that native hemoglobin did not perform sufficiently well as a flocculant.

However, the data indicated that hemoglobin modified by esterifying its carboxylic acid groups with a short alkyl (e.g., a methyl group ("methylated hemoglobin"), ethyl group, propyl group, butyl group) performed sufficiently well as a flocculant for fertilizer production. Accordingly, in some embodiments, the flocculant is a protein comprising alkylated (e.g., methylated, ethylated, propylated, butylated) carboxylic acid sidechains. In some embodiments, the flocculant is and/or comprises alkylated (e.g., methylated, ethylated, propylated, butylated) hemoglobin.

In some embodiments, the hemoglobin is adult hemoglobin (e.g., hemoglobin A1, $\alpha_2\beta_2$). In some embodiments, the hemoglobin comprises hemoglobin, alpha 1; and hemoglobin beta (e.g., the HBA1 and HBB proteins). In some embodiments, the hemoglobin alpha subunit comprises a sequence according to SEQ ID NO: 1:

```
MVLSPADKTNVKAAWGKVGAHAGEYGAEALERMFLSFPTTKTYFPHFDLS

HGSAQVKGHGKKVADALTNAVAHVDDMPNALSALSDLHAHKLRVDPVNFK

LLSHCLLVTLAAHLPAEFTPAVHASLDKFLASVSTVLTSKYR
```

In some embodiments, the hemoglobin beta subunit comprises a sequence according to SEQ ID NO: 2:

```
MVHLTPEEKSAVTALWGKVNVDEVGGEALGRLLVVYPWTQRFFESFGDLS

TPDAVMGNPKVKAHGKKVLGAFSDGLAHLDNLKGTFATLSELHCDKLHVD

PENFRLLGNVLVCVLAHHFGKEFTPPVQAAYQKVVAGVANALAHKYH
```

In some embodiments, the technology provides a nucleic acid encoding a polypeptide comprising SEQ ID NO: 1. In some embodiments, the technology provides a nucleic acid encoding a polypeptide comprising SEQ ID NO: 2. In some embodiments, the technology provides a nucleic acid at least 70% (e.g., at least 70, 71, 72, 73, 74, 75, 76, 77, 78, 79, 80, 81, 82, 83, 84, 85, 86, 87, 88, 89, 90, 91, 92, 93, 94, 95, 96, 97, 97.5, 98, 98.5, 99, 99.5, 99.9, or 100% identical) to a nucleic acid encoding a polypeptide comprising SEQ ID NO: 1 and/or SEQ ID NO: 2. In some embodiments, the technology provides a host cell (e.g., a microorganism) comprising a nucleic acid encoding a polypeptide comprising SEQ ID NO: 1. In some embodiments, the technology provides a host cell (e.g., a microorganism) comprising a nucleic acid encoding a polypeptide comprising SEQ ID NO: 2. In some embodiments, the technology provides a host cell (e.g., a microorganism) comprising a nucleic acid encoding a polypeptide comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 1. In some embodiments, the technology provides a host cell (e.g., a microorganism) comprising a nucleic acid encoding a polypeptide comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 2. In some embodiments, the technology provides a host animal expressing a polypeptide comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 1 or SEQ ID NO: 2. In some embodiments, the technology provides a host animal expressing a nucleic acid encoding a polypeptide comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 1 or SEQ ID NO: 2.

Without being bound by theory, it is contemplated that alkylating the hemoglobin alters the protein structure, which produces the improvement in flocculation behavior. Accordingly, in some embodiments, the technology comprises use of other methods for partially denaturing a hemoglobin protein (e.g., heat, exposure to low-polarity liquids, small amounts of detergents or chaotropic agents, etc.). Furthermore, in some embodiments, the technology comprises use of a hemoglobin protein comprising one or more amino acid substitutions (e.g., a substituted variant of hemoglobin (e.g., a hemoglobin comprising a substituted variant of a hemoglobin alpha subunit and/or a hemoglobin comprising a substituted variant of a hemoglobin beta subunit). In some embodiments, the technology comprises use of a hemoglobin protein comprising an alpha subunit comprising one or more amino acid substitutions (e.g., with respect to SEQ ID NO: 1) and/or a hemoglobin protein comprising a beta subunit comprising one or more amino acid substitutions (e.g., with respect to SEQ ID NO: 2). In some embodiments, the technology comprises use of a hemoglobin protein comprising an alpha subunit comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 1. In some embodiments, the technology comprises use of a hemoglobin protein comprising a beta subunit comprising an amino acid sequence that is at least 50% identical (e.g., at least approximately 50, 55, 60, 65, 70, 75, 80, 81, 82, 83, 84, 85, 86, 87, 88, 89, 90, 91, 92, 93, 94, 95, 96, 97, 97.5, 98, 98.5, 99, 99.5, 99.9, or 100% identical) to SEQ ID NO: 2.

Alkylation (e.g., methylation, ethylation, propylation, butylation) is a modification that happens by degrees, over time; hemoglobin that is reacted for a short time may have 10% of its carboxylic acid groups alkylated, while hemoglobin reacted for a longer time may be 60% alkylated. The reaction usually stops short of 100% alkylation, e.g., because some reactive groups may be shielded in the interior of the folded polypeptide, though reaction conditions can be adjusted to increase the alkylation (e.g., use of mild denaturants to "loosen" the protein fold). Thus, hemoglobin with different degrees of alkylation can be prepared simply by allowing the reaction to proceed for different lengths of time and/or by adjusting the reaction conditions. Accordingly, in some embodiments, alkylated (e.g., methylated, ethylated, propylated, butylated) hemoglobin is alkylated at approximately 10% to 80% (e.g., 5, 10, 15, 20, 25, 30, 35, 40, 45, 50, 55, 60, 65, 70, 75, 80, or 85%) of the hemoglobin carboxylic acid groups (e.g., approximately 10% to 80% (e.g., 5, 10, 15, 20, 25, 30, 35, 40, 45, 50, 55, 60, 65, 70, 75, 80, or 85%) of the hemoglobin carboxylic acid side chains are esterified with an alkyl (e.g., methyl, ethyl, propyl, butyl) group).

Further, during the development of embodiments of the technology provided herein, experiments were conducted and data were collected indicating that inclusion of 30% water in the methylation reaction did not decrease the performance of methylated hemoglobin as a flocculant. Accordingly, in some embodiments, the flocculant is prepared by alkylating red blood cell cytoplasm, which is primarily a solution of hemoglobin. Further, past research showed that a flocculant comprising hemoglobin and plasma was no less potent than a flocculant made from hemoglobin alone. Thus, in some embodiments, the flocculant is prepared by alkylating hemoglobin and plasma.

In some embodiments, the flocculant comprising alkylated (e.g., methylated, ethylated, propylated, butylated) hemoglobin is used at a concentration of approximately 700-1400 ppm (e.g., 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, or 1450 ppm).

The technology also contemplates hemoglobin modified by other constituents, e.g., those that have a similar structure, atomic configuration, and/or chemical character as the ethyl groups described herein.

In some embodiments, the flocculants used in the technology provided herein do not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate).

Primers and Priming

In some embodiments, the technology comprises use of a primer that is added to ADE prior to adding a flocculant. For example, some embodiments comprise adding a primer to an ADE comprising a % TS of more than 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, or 2.7% w/v. In some embodiments, methods comprise adding a primer to ADE comprising a % TS of approximately 2.5 to 3.5% (e.g., 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50% w/v). Accordingly, embodiments of methods comprise adding a primer (e.g., a borate (e.g., $Na_3BO_3$)) to a composition comprising ADE (e.g., ADE comprising more than 1.0% total solids (e.g., more than 1.0, 1.1, 1.2, 1.3, 1.4, 1.5, 1.6, 1.7, 1.8, 1.9, 2.0, 2.1, 2.2, 2.3, 2.4, or 2.5% w/v total solids) and/or comprising 2.5 to 3.5% total solids (e.g., comprising 2.5, 2.6, 2.7, 2.8, 2.9, 3.0, 3.1, 3.2, 3.3, 3.4, 3.5, or more than 3.5% w/v total solids)).

As used herein, the term "primer" refers to a composition that is added to ADE and that crosslinks organic molecules in the ADE to produce various branched molecular structures having a higher molecular weight than prior to adding the primer. Crosslinks may be formed by covalent bonds or non-covalent interactions (e.g., hydrogen bonding, van der Waals interactions, hydrophobic interactions, charge pair interactions, etc.) that produce stabilized interactions between organic molecules or between two portions of the same organic molecule. An exemplary primer is boron, e.g., as provided as a derivative of boric acid, e.g., borate (e.g., borate anion, orthoborate($^{3-}$) ion, $[BO_3]^{3-}$). In some embodiments, the borate primer is provided with an appropriate counterion, e.g., sodium ion in $Na_3BO_3$.

In some embodiments, methods comprise adding a primer (e.g., borate (e.g., $Na_3BO_3$)) to unfiltered, undiluted ADE. In some embodiments, methods comprise adding a primer (e.g., borate (e.g., $Na_3BO_3$)) to defibered ADE. In some embodiments, methods comprise adding a primer (e.g., borate (e.g., $Na_3BO_3$)) to ADE that is defibered but that is not filtered and that is not diluted. In some embodiments, methods comprise adding a primer (e.g., borate (e.g., $Na_3BO_3$)) to ADE that is diluted and has a % TS of more than 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, or 2.7% w/v. In some embodiments, methods comprise adding a primer (e.g., borate (e.g., $Na_3BO_3$)) to ADE that is diluted and has a % TS of approximately 2.5 to 3.5% (e.g., 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50% w/v).

In some embodiments, methods comprise adding a solution of sodium borate ($Na_3BO_3$) to the ADE, adding a flocculant (e.g., sodium alginate as described herein (e.g., to a final concentration of flocculant of 0.2 to 0.4% w/v)), and adding a coagulant and/or coflocculant (e.g., calcium ion (e.g., $CaCl_2$ (e.g., 0.75-1.5% w/v or approximately 3% w/v (e.g., 2.5, 2.6, 2.7, 2.8, 2.9, 3.0, 3.1, 3.2, 3.3, 3.4, or 3.5%)))). In some embodiments, the ADE was heated to approximately 100 to 180° C. (e.g., to at least 100, 110, 120, 130, 140, 150, 160, 170, or 180° C.) while stirring.

In some embodiments, methods comprise preparing a stock solution of $Na_3BO_3$ by dissolving $Na_3BO_3$ in water (e.g., water sourced from the digester). In some embodiments, the stock solution has a concentration of $Na_3BO_3$ in water (e.g., water from the digester) that is approximately 10% w/v (e.g., approximately 5 to 15 w/v (e.g., 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, or 15.0 w/v)).

In some embodiments, methods comprise adding a $Na_3BO_3$ stock solution to ADE to provide a final borate concentration of at least 0.05% to 0.15% w/v (e.g., at least 0.05%, 0.06%, 0.07%, 0.08%, 0.09%, 0.10%, 0.11%, 0.12%, 0.13%, 0.14%, or 0.15% w/v). In some embodiments, methods comprise adding a $Na_3BO_3$ stock solution to ADE to provide a final borate concentration of approximately 0.025 to 0.25% w/v (e.g., 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250% w/v). In some embodiments, methods comprise adding a $Na_3BO_3$ stock solution to heated ADE (e.g., at a temperature of approximately 100 to 180° C. (e.g., to at least 100, 110, 120, 130, 140, 150, 160, 170, or 180° C.)) to provide a final borate concentration of at least 0.05% to 0.15% w/v (e.g., at least 0.05%, 0.06%, 0.07%, 0.08%, 0.09%, 0.10%, 0.11%, 0.12%, 0.13%, 0.14%, or 0.15% w/v). In some embodiments, methods comprise adding a $Na_3BO_3$ stock solution to heated ADE (e.g., at a temperature of approximately 100 to 180° C. (e.g., to at least 100, 110, 120, 130, 140, 150, 160, 170, or 180° C.)) to provide a final borate concentration of approximately 0.025 to 0.25% w/v (e.g., 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250% w/v). In some embodiments, methods comprise mixing (e.g., stirring) the primed ADE comprising borate for approximately 10 to 30 minutes (e.g., approximately 10, 11, 12, 13, 14, 15, 16, 17, 18, 19, 20, 21, 22, 23, 24, 25, 26, 27, 28, 29, 30, or more minutes), e.g., prior to adding a flocculant (e.g., an alginate flocculant (e.g., a sodium alginate flocculant)).

The technology is not limited in the source of the boron (e.g., borate) used for the priming step. Accordingly, embodiments of methods provided herein comprise priming the ADE (e.g., heated ADE) by adding sodium borate, boric acid, or other readily soluble boron (B) compounds in concentrations ranging from 0.025 to 0.25% of the ADE mixture on a w/v basis (e.g., 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250% w/v boron and/or borate). In some embodiments, the boron (e.g., borate) compound is added as a solid. In some embodiments, the boron (e.g., borate) compound is added in solution (e.g., at a concentration depending on the temperature of the water available for dissolution of the boron (e.g., borate) compound and/or considering a volume of boron (e.g., borate) solution to add to provide a desired dilution of ADE during the priming step). In some embodiments, the boron compound (e.g., borate) is added after a defibering step, e.g., as described herein. In some embodiments, the boron compound is added 10 to 30 minutes (e.g., 10, 11, 12, 13, 14, 15, 16, 17, 18, 19, 20, 21, 22, 23, 24, 25, 26, 27, 28, 29, or 30 minutes) before adding other components (e.g., flocculant and/or coflocculant/coagulant) to allow sufficient reaction time for producing branched organic molecules in the ADE. In some embodiments, the ADE is mixed, e.g., by stirring and/or by agitation of the ADE as it transits through the pipes and other structures of a solids recovery system.

In some embodiments, methods comprise adding a flocculating agent (e.g., an alginate (e.g., an alginate prepared from a seaweed (e.g., a brown alga) as described herein)) after the priming has been performed. In some embodiments, methods comprise adding a flocculating agent that is sodium alginate (e.g., Na-alginate), e.g., obtained from a commercial source. In some embodiments, methods comprise adding a flocculating agent that is prepared from a seaweed (e.g., a seaweed comprising a high concentration of alginate (e.g., a brown alga)) extracted in a NaOH solution, e.g., prepared by a method as described herein. In some embodiments, methods comprise adding a flocculating agent (e.g., alginate (e.g., sodium alginate)) to ADE to provide a concentration of the flocculating agent (e.g., alginate (e.g., sodium alginate)) that is approximately 0.2 to 0.5% w/v (e.g., approximately 0.20, 0.25, 0.30, 0.35, 0.40, 0.45, or 0.50% w/v) in the ADE.

In some embodiments, methods comprise adding calcium ion (e.g., $CaCl_2$) to the ADE/flocculant mixture, e.g., to replace and/or displace $Na^+$ associated with the organic molecules in the ADE/flocculant composition. In some embodiments, methods comprise preparing a stock solution of calcium ion (e.g., $CaCl_2$) in water. In some embodiments, methods comprise preparing a stock solution of 10% w/v (e.g., 5 to 20% w/v (e.g., 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 w/v)) calcium ion (e.g., $CaCl_2$) in water. In some embodiments, methods comprise adding calcium ion (e.g., $CaCl_2$) to provide a concentration of approximately 0.75 to 1.5% (e.g., 0.75, 0.80, 0.85, 0.90, 0.95, 1.00, 1.05, 1.10, 1.15, 1.20, 1.25, 1.30, 1.35, 1.40, 1.45, 1.50% w/v). In some embodiments, methods comprise adding calcium ion (e.g., $CaCl_2$) to provide a concentration of approximately 0.75 to 5% w/v (e.g., 0.75, 1.00, 1.25, 1.50, 1.75, 2.00, 2.25, 2.50, 2.75, 3.00, 3.25, 3.50, 3.75, 4.00, 4.25, 4.50, 4.75, or 5.00 w/v). In some embodiments, methods comprise adding calcium ion (e.g., $CaCl_2$) to provide a concentration of approximately 3% w/v (e.g., 2 to 5 w/v (e.g., 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0% w/v)). In some embodiments, methods comprise adding calcium ion (e.g., $CaCl_2$) to provide a concentration of approximately 1000 to 30000 ppm (e.g., 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, 20000, 20500, 21000, 21500, 22000, 22500, 23000, 23500, 24000, 24500, 25000, 25500, 26000, 26500, 27000, 27500, 28000, 28500, 29000, 29500, or 30000 ppm or more than 30000 ppm).

In some embodiments, methods comprise separating flocculated solids from liquid, e.g., by settling using gravity, floating using dissolved air bubbles, or other separation techniques to provide an efficient solid-liquid separation.

As described herein, embodiments of the technology provide methods for harvesting solids from ADE in a manner that meets National Organic Program and other organic agriculture standards such as those applied by the Organic Materials Research Institute. In some embodiments, methods comprise priming ADE with 0.025-0.25% w/v (e.g., (e.g., 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250% w/v) borate (e.g., sodium borate) for 10-30 minutes (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, or 30.0 minutes); adding alginate to a concentration of 0.2-0.5% w/v (e.g., approximately 0.20, 0.25, 0.30, 0.35, 0.40, 0.45, or 0.50% w/v) to induce flocculation; and adding calcium to a concentration of 0.75-5% w/v (e.g., 0.75, 1.00, 1.25, 1.50, 1.75, 2.00, 2.25, 2.50, 2.75, 3.00, 3.25, 3.50, 3.75, 4.00, 4.25, 4.50, 4.75, or 5.00% w/v) to displace sodium and cause the solids to separate from the liquid. In some embodiments, the solids are used to produce a fertilizer (e.g., a fertilizer that is compliant with National Organic Program and/or other organic agriculture standards such as those applied by the Organic Materials Research Institute), e.g., as described herein and/or hereinbelow in the following section.

Methods of Producing a Fertilizer

In some embodiments, the technology provides methods for producing a fertilizer. In some embodiments, methods for producing a fertilizer comprise providing, obtaining, or producing anaerobic digester effluent (ADE), e.g., from a waste management system (e.g., animal waste (e.g., from a manure processing facility (e.g., a farm and/or dairy manure processing facility)). In some embodiments, methods comprise separating sand from material (e.g., animal waste) prior to inputting the material into the anaerobic digester (see, e.g., FIG. 1).

In particular, anaerobic digestion is a process comprising biodegrading material in the absence of oxygen. In some embodiments, microorganisms are resident in the ADE. In some embodiments, the microorganisms resident in the ADE are supplemented by adding non-resident microorganisms to biodegrade the material. Accordingly, some embodiments comprise providing one or more microorganisms (e.g., in a culture) that biodegrade the material. In some embodiments, methods comprise culturing one or more microorganisms and adding the one or more microorganisms to the ADE. In some embodiments, methods comprise inoculating waste material with ADE (e.g., from previous treatment).

Anaerobic digestion comprises the steps of hydrolysis, acidogenesis (fermentation), acetogenesis, and methanogenesis. In some embodiments, the technology comprises use of microorganisms that perform these steps in the anaerobic digestion process. In some embodiments, the microorganisms that biodegrade the material comprise microorganisms that hydrolyze materials in the ADE. In some embodiments, the microorganisms comprise one or more members of Bacteria, Archaea, and/or Eukaryota. In particular, in some embodiments, microorganisms degrade organic polymers (e.g., carbohydrates; proteins) to produce smaller derivatives (e.g., simpler oligomeric sugars and/or monomeric sugars; oligopeptides and/or amino acids). In some embodiments, the organic polymers are insoluble and the degradation products are soluble. In some embodiments, the smaller derivatives (e.g., simpler oligomeric sugars and/or monomeric sugars; oligopeptides and/or amino acids) provide carbon and energy inputs for other microorganisms (e.g., bacteria, archaea, and/or eukaryotes). In some embodiments, acidogenic microorganisms (e.g., acidogenic bacteria) convert the sugars and amino acids into carbon dioxide, hydrogen, ammonia, and organic acids. Then, in some embodiments, microorganisms convert these resulting organic acids into acetic acid, along with additional ammonia, hydrogen, and carbon dioxide. Lastly, in some embodiments, microorganisms (e.g., methanogens (e.g., methanogenic bacteria and/or methanogenic archaea) convert these products to methane and carbon dioxide. See, e.g., Tabatabaei (2010) "Importance of the methanogenic archaea populations in anaerobic wastewater treatments" *Process Biochemistry* 45: 121-25, incorporated herein by reference.

In some embodiments, methods comprise removing fibrous material from the ADE to produce a filtered effluent (see, e.g., FIG. 1). In some embodiments, methods comprise filtering the ADE (e.g., using a screen) to remove fibrous material from the ADE to produce a filtered effluent (see, e.g., FIG. 1). In some embodiments, methods comprise passing the ADE through screw presses to remove fibrous material and produce a filtered effluent (see, e.g., FIG. 1). In some embodiments, the filtered effluent comprises nutrients dissolved and/or suspended in water.

In some embodiments, methods comprise providing, obtaining, and/or producing a flocculant as described herein. In some embodiments, the flocculant is an organic flocculant. In some embodiments, the flocculant is a biodegradable flocculant.

In some embodiments, methods comprise providing, obtaining, and/or producing a flocculant that is, is derived from, is isolated from, and/or comprises alkylated (e.g., methylated, ethylated, propylated, butylated) hemoglobin; whole blood (e.g., from chicken); alginic acid; calcium alginate; carrageenan (e.g., iota carrageenan); powdered *Ascophyllum nodosum*, potassium (e.g., having an NPK of 0-0-16 (e.g., available as GROWER'S SECRET seaweed powder)); giant brown seaweed (e.g., *Ecklonia maxima* (e.g., MIDWESTERN BIOAG KELPAK liquid seaweed concentrate)); kelp; kelp powder; Atlantic kombu (e.g., *Laminaria digitata*) alginate extract; *Ascophyllum nodosum* alginate extract; brown algae, red algae, green algae, polygalacturonic acid; sodium alginate; starch (e.g., LIFELINE 5305 starch); polymeric carbohydrate; iron (II) sulfate; iron (III) sulfate; and/or polymerized iron sulfate. In some embodiments, the flocculant comprises a cation (e.g., $Fe^{2+}$, $Mg^{2+}$, $K^+$, $Ca^{2+}$).

In some embodiments, methods comprise providing, obtaining, and/or producing a flocculant that is, is derived from, is isolated from, and/or comprises a polysaccharide. In some embodiments, the flocculant is negatively charged. In some embodiments, the flocculant is a linear copolymer (e.g., comprising homopolymeric blocks of (1-4)-linked β-D-mannuronate and α-L-guluronate respectively, covalently linked in different sequences and/or blocks). In some embodiments, the flocculant is used at a concentration of approximately 200-400 ppm (e.g., 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, or 450 ppm). In some embodiments, the flocculant is used at a concentration of approximately 2000-4000 ppm (e.g., 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, or 4500 ppm). In some embodiments, the flocculant is used at a concentration of approximately 0.2 to 0.5% w/v (e.g., 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50% w/v).

For example, in some embodiments, the flocculant is and/or comprises alginate, also known as alginic acid or algin. In some embodiments, the flocculant comprises alginate and calcium. In some embodiments, the flocculant is and/or comprises sodium alginate, potassium alginate, and/or calcium alginate. In some embodiments, alginate is derived from seaweed (e.g., in a NOP-compliant manner). In some embodiments, the flocculant (e.g., alginate) is derived from brown seaweed. In some embodiments, the flocculant (e.g., alginate) is derived from a brown seaweed of the class Phaeophyceae. In some embodiments, the flocculant (e.g., alginate) is derived from Atlantic kombu (e.g., *Laminaria* species (e.g., *Laminaria digitata, Laminaria japonica*)), kelp (e.g., *Macrocystis* species (e.g., *Macrocystis pyrifera*)), or *Ascophyllum* species (e.g., *Ascophyllum nodosum*). In some embodiments, the flocculant (e.g., alginate) is derived from a microbial (e.g., bacterial, archaeal, and/or microbial eukaryotic) source. In some embodiments, the flocculant (e.g., alginate) is derived from a microbe isolated from nature; in some embodiments, the flocculant is derived from a recombinant microbe comprising a heterologous nucleic acid. In some embodiments, the flocculant (e.g., alginate) is derived from a bacterium of the genus *Pseudomonas* or *Azotobacter*. See, e.g., Remminghorst and Rehm "Microbial Production of Alginate: Biosynthesis and Applications" in *Microbial Production of Biopolymers and Polymer Precursors: Applications and Perspectives* (Caister Academic Press, Bernd H. A. Rehm (ed.), 2009), incorporated herein by reference. In some embodiments, alginate is used as a flocculant at a concentration of approximately 200-400 ppm (e.g., 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, or 450 ppm). In some embodiments, alginate is used as a flocculant at a concentration of approximately 2000-4000 ppm (e.g., 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, or 4500 ppm). In some embodiments, alginate is used as a flocculant at a concentration of approximately 0.2 to 0.5% w/v (e.g., 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50% w/v).

In some embodiments, methods comprise providing, obtaining, and/or producing a flocculant that is, is derived from, is isolated from, and/or comprises a flocculant that is derived from an alga. In some embodiments, the flocculant is from a red alga, a brown alga, or a green alga. In some embodiments, the flocculant is derived from an alga from the taxonomic classification Rhodoplantae (e.g., red algae), Phaeophyceae (e.g., brown algae), Chlorophyta (e.g., green algae), and/or Charophyta (e.g., green algae).

In some embodiments, methods comprise producing a flocculant. In some embodiments, producing a flocculant comprises producing an alginate. In some embodiments, producing a flocculant comprises producing an alkylated hemoglobin.

In some embodiments, producing an alginate comprises drying and pulverizing seaweed to provide a seaweed powder; treating the seaweed powder with acid (e.g., hydrochloric acid (e.g., 0.1 N HCl (e.g., 0.07, 0.08, 0.09, 0.1, 0.11, 0.12, or 0.13 N HCl))), e.g., for approximately 24 hours (e.g., 20, 21, 22, 23, 24, 25, 26, 27, or 28 hours), to produce an acidified seaweed powder; and treating the acidified seaweed powder with a base (e.g., $Na_2CO_3$ (e.g., 2% $Na_2CO_3$ (e.g., 1.5, 1.6, 1.7, 1.8, 1.9, 2.0, 2.1, 2.2, 2.3, 2.4, or 2.5% $Na_2CO_3$))), e.g., for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.), to provide a neutralized seaweed powder. In some embodiments, methods further comprise filtering the neutralized seaweed powder to provide a filtered seaweed powder. In some embodiments, methods further comprise washing the filtered seaweed powder with ethanol (e.g., an equal volume of ethanol) to provide an alginate.

In some embodiments, producing an alginate comprises comprising drying and pulverizing seaweed to provide a seaweed powder; and treating the acidified seaweed powder with a base (e.g., $Na_2CO_3$ (e.g., 2% $Na_2CO_3$ (e.g., 1.5, 1.6, 1.7, 1.8, 1.9, 2.0, 2.1, 2.2, 2.3, 2.4, or 2.5% $Na_2CO_3$))), e.g., for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.), to provide a neutralized seaweed powder. In some embodiments, methods further comprise filtering the neutralized seaweed powder to provide a filtered seaweed powder. In some embodiments, methods further comprise washing the filtered seaweed powder with ethanol (e.g., an equal volume of ethanol) to provide an alginate).

In some embodiments, producing an alginate comprises drying and pulverizing seaweed to provide a seaweed powder; and treating the seaweed powder with base (e.g., NaOH (e.g., 2% NaOH (e.g., 1.5, 1.6, 1.7, 1.8, 1.9, 2.0, 2.1, 2.2, 2.3, 2.4, or 2.5% NaOH))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, producing an alginate comprises drying and pulverizing seaweed to provide a seaweed powder; and treating the seaweed powder with base (e.g., KOH (e.g., 2% KOH (e.g., 1.5, 1.6, 1.7, 1.8, 1.9, 2.0, 2.1, 2.2, 2.3, 2.4, or 2.5% KOH))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, producing an alginate comprises drying and pulverizing seaweed to provide a seaweed powder; and treating the seaweed powder with base (e.g., NaOH/KOH (e.g., 2% NaOH/2% KOH (e.g., (e.g., 1.5, 1.6, 1.7, 1.8, 1.9, 2.0, 2.1, 2.2, 2.3, 2.4, or 2.5% NaOH and 1.5, 1.6, 1.7, 1.8, 1.9, 2.0, 2.1, 2.2, 2.3, 2.4, or 2.5% KOH)))), e.g., for approximately 24 hours (e.g., 20, 21, 22, 23, 24, 25, 26, 27, or 28 hours) at room temperature (e.g., approximately 18 to 25° C. (e.g., approximately 18, 19, 20, 21, 22, 23, 24, or 25° C.)) or for approximately 5 hours (e.g., 3, 4, 5, 6, 7, 8, 9, or 10 hours) at approximately 40° C. (e.g., 35, 36, 37, 38, 39, 40, 41, 42, 43, 44, or 45° C.) to provide an alginate.

In some embodiments, producing an alginate comprises drying and grinding an alginate-producing plant (e.g., seaweed (e.g., an alga (e.g., a brown alga (e.g., *Laminaria digitata, Ascophyllum nodosum, Macrocystis pyrifera,* etc.)))). In some embodiments, grinding the alginate-producing plant comprises using a combination of electric grinders and/or mortar and pestle. In some embodiments, methods comprise grinding the alginate-producing plant to a size of approximately 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh). In some embodiments, the ground alginate-producing plant is screened using sieves of various mesh sizes (e.g., 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh)) to obtain an appropriate particle (e.g., mesh) size and/or amount of ground alginate-producing plant for preparing alginate. In some embodiments, methods comprise reacting the ground alginate-producing plant (e.g., an alga (e.g., a brown alga (e.g., *Laminaria digitata, Ascophyllum nodosum, Macrocystis pyrifera,* etc.))) with NaOH (e.g., 1% to 4% w/v NaOH (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0% w/v NaOH)) for a time of 8 to 16 hours (e.g., 8.0, 8.5, 9.0, 9.5, 10.0, 10.5, 11.0, 11.5, 12.0, 12.5, 13.0, 13.5, 14.0, 14.5, 15.0, 15.5, or 16.0 hours) at room temperature (e.g., 18.0, 18.5, 19.0, 19.5, 20.0, 20.5, 21.0, 21.5, 22.0, 22.5, 23.0, 23.5, 24.0, 24.5, or 25.0° C.) with stirring at approximately 100 rpm (e.g., 50-150 rpm (e.g., 50, 55, 60, 65, 70, 75, 80, 85, 90, 95, 100, 105, 110, 115, 120, 125, 130, 135, 140, 145, or 150 rpm)).

In some embodiments, producing an alkylated hemoglobin comprises alkylating (e.g., esterifying) one or more hemoglobin carboxylate side chains with an alkyl (e.g., a methyl, ethyl, propyl, butyl). In some embodiments, producing an alkylated hemoglobin comprises alkylating (e.g., esterifying) red blood cell cytoplasm. In some embodiments, producing an alkylated hemoglobin comprises alkylating (e.g., esterifying) hemoglobin and plasma.

In some embodiments, methods comprise adding a flocculant to the filtered effluent and/or to ADE to produce a flocculated liquid comprising floc solids and liquid.

In some embodiments, methods comprise adding a primer (e.g., borate) to ADE prior to adding a flocculant (e.g., alginate). Accordingly, in some embodiments, methods comprise adding a primer (e.g., borate) to ADE and adding a flocculant (e.g., alginate).

In some embodiments, methods comprise adding a coflocculant to the filtered effluent comprising the flocculant. In some embodiments, the coflocculant is an ion (e.g., a cation (e.g., a metal cation (e.g., (e.g., $Fe^{2+}$, $Mg^{2+}$, $K^+$, $Ca^{2+}$))). In some embodiments, methods comprise adding a coagulant to the filtered effluent comprising the flocculant.

In some embodiments, floc solids comprise phosphorous, organic nitrogen, and micronutrients (see, e.g., FIG. 1; see Table 10). Accordingly, in some embodiments, methods comprise flocculating the filtered effluent, e.g., to produce a flocculated liquid comprising floc solids and liquid.

In some embodiments, methods comprise separating the floc solids from the liquid (see, e.g., FIG. 1). The technology is not limited in the separation process used. For example, in some embodiments, the flocculated liquid is provided as input into a Dissolved Air Flotation (DAF) tank. In some embodiments, methods comprise skimming floc solids from the flocculated liquid (e.g., in a DAF tank) (see, e.g., FIG. 1).

In some embodiments, methods comprise filtering floc solids from the flocculated liquid. In some embodiments, separating the floc solids from the liquid comprises use of a centrifugal separation method; gravitational separation method; a sieving, screening, and/or filtering separation method; and/or other separation methods known in the art.

In some embodiments, methods comprise removing water from floc solids, e.g., to produce a cake, e.g., a dewatered cake comprising fine solids and nutrients trapped by flocculation. The technology is not limited in the technology used to remove water from the floc solids and includes, but is not limited to, pressure-based methods (e.g., compressing and/or squeezing the floc solids to remove the water); evaporation-based methods (e.g., drying (e.g., drying with elevated temperature and/or decreased humidity), spraying); and/or temperature-based methods (e.g., drying with elevated temperature).

In some embodiments, the dewatered cake is used as a fertilizer (e.g., an organic fertilizer) and/or to produce a composition comprising a fertilizer (e.g., an organic fertilizer). In some embodiments, the technology provides an improved fertilizer (e.g., an organic fertilizer) in which the concentration of nutrients in the dewatered cake is maximized. In some embodiments, nutrients are added to a fertilizer (e.g., an organic fertilizer) composition produced from a dewatered cake to produce an improved fertilizer (e.g., an organic fertilizer). In some embodiments, a binder and/or filler is/are added to the flocculated liquid prior to producing a cake or dewatered cake for use as a fertilizer (e.g., an organic fertilizer). Accordingly, in some embodiments, the technology provides a dewatered cake comprising a binding and/or a filler to provide a fertilizer (e.g., an organic fertilizer).

In some embodiments, methods comprise pelletizing floc solids to produce a pelletized fertilizer (e.g., an organic fertilizer). In some embodiments, methods comprise granulizing floc solids to produce a granulized fertilizer (e.g., an organic fertilizer). In some embodiments, methods comprise dewatering a pelletized fertilizer (e.g., an organic fertilizer). In some embodiments, methods comprise dewatering a granulated fertilizer (e.g., an organic fertilizer). In some embodiments, methods comprise pelletizing a dewatered cake to produce a pelletized fertilizer (e.g., an organic fertilizer). In some embodiments, methods comprise granulizing a dewatered cake to produce a granulized fertilizer (e.g., an organic fertilizer).

In some embodiments, the methods comprise removing at least a portion (e.g., at least 50, 55, 60, 65, 70, 75, 80, 85, 90, 95, 96, 97, 98, 99, or 100%) of a non-organic component from a fertilizer or fertilizer intermediate. In some embodiments, removing the non-organic component comprises converting at least a portion (e.g., at least 50, 55, 60, 65, 70, 75, 80, 85, 90, 95, 96, 97, 98, 99, or 100%) of the non-organic component to organic components. In some embodiments, methods comprise removing a non-organic component from a fertilizer or fertilizer intermediate to produce an organic fertilizer in which the non-organic component is minimized and/or eliminated. In some embodiments, methods comprise removing a non-organic component from a fertilizer or fertilizer intermediate to produce a fertilizer in which the non-organic component is undetectable and/or present at a level below a threshold for characterizing the fertilizer as an organic fertilizer, e.g., as defined herein. In some embodiments, removing the non-organic component comprises incubating a fertilizer or fertilizer intermediate to promote biodegradation of the non-organic component by microorganisms present in the fertilizer or fertilizer intermediate. In some embodiments, removing the non-organic component comprises inoculating a fertilizer or fertilizer intermediate and incubating the fertilizer or fertilizer intermediate to promote biodegradation of the non-organic component by microorganisms present in the fertilizer or fertilizer intermediate.

Furthermore, in some embodiments, the methods comprise removing at least a portion (e.g., at least 50, 55, 60, 65, 70, 75, 80, 85, 90, 95, 96, 97, 98, 99, or 100%) of the flocculant (e.g., biodegradable flocculant) from a fertilizer or fertilizer intermediate. In some embodiments, removing the flocculant (e.g., biodegradable flocculant) comprises converting at least a portion (e.g., at least 50, 55, 60, 65, 70, 75, 80, 85, 90, 95, 96, 97, 98, 99, or 100%) of the flocculant (e.g., biodegradable flocculant) to organic components. In some embodiments, methods comprise removing a flocculant (e.g., biodegradable flocculant) from a fertilizer or fertilizer intermediate to produce an organic fertilizer in which the flocculant (e.g., biodegradable flocculant) is minimized and/or eliminated. In some embodiments, methods comprise removing a flocculant (e.g., biodegradable flocculant) from a fertilizer or fertilizer intermediate to produce a fertilizer in which the flocculant (e.g., biodegradable flocculant) is undetectable and/or present at a level below a threshold for characterizing the fertilizer as an organic fertilizer, e.g., as defined herein. In some embodiments, removing the flocculant comprises incubating a fertilizer or fertilizer intermediate to promote biodegradation of a biodegradable flocculant by microorganisms present in the fertilizer or fertilizer intermediate. In some embodiments, removing the flocculant comprises inoculating a fertilizer or fertilizer intermediate and incubating the fertilizer or fertilizer intermediate to promote biodegradation of a biodegradable flocculant by microorganisms present in the fertilizer or fertilizer intermediate.

In some embodiments, methods comprise characterizing microorganisms in ADE, a fertilizer intermediate, and/or a fertilizer. In some embodiments, characterizing microorganisms comprises culture-based methods, metagenomics methods (e.g., bulk nucleic acid extraction, sequencing, and identification and/or characterization of microorganisms or the functional capacity of microorganisms), and/or taxonomic methods (e.g., nucleic acid based methods (e.g., sequencing ribosomal RNA and comparing sequences to sequence databases and/or constructing phylogenies)). In some embodiments, methods comprise characterizing the enzymatic potential and/or function present in ADE without identifying the microorganisms present. For example, some embodiments comprise characterizing ADE for enzymatic potential and/or functions for hydrolysis, acidogenesis, acetogenesis, and/or methanogenesis, e.g., to assess the anaerobic digestion capacity and/or efficiency. For example, some embodiments comprise characterizing ADE, a fertilizer intermediate, and/or a fertilizer for enzymatic potential and/or functions for biodegradation capacity and/or efficiency of a non-organic component and/or biodegradable flocculant.

In some embodiments, methods comprise adding one or more microorganisms and/or enzymes to ADE, a fertilizer intermediate, and/or a fertilizer to improve anaerobic digestion capacity and/or efficiency or to improve biodegradation capacity and/or efficiency of a non-organic component and/or biodegradable flocculant.

In some embodiments, methods comprise analyzing an organic fertilizer. In some embodiments, methods comprise measuring nutrient levels (e.g., measuring the concentration, absolute amount, and/or relative amount of one or more of nitrogen, carbon, phosphorus, potassium, calcium, magnesium, sulfur, boron, chlorine, cobalt, copper, iron, manganese, molybdenum, sodium, nickel, or zinc) in an organic fertilizer. In some embodiments, methods comprise producing a report comprising the results of nutrient analysis. In some embodiments, methods comprise providing a report comprising the results of nutrient analysis to a user of an organic fertilizer as described herein. See, e.g., Table 10.

In some embodiments, methods comprise requesting an analysis of an organic fertilizer. In some embodiments, methods comprise requesting a measurement of nutrient levels (e.g., measuring the concentration, absolute amount, and/or relative amount of one or more of nitrogen, carbon, phosphorus, potassium, calcium, magnesium, sulfur, boron, chlorine, cobalt, copper, iron, manganese, molybdenum, sodium, nickel, or zinc) in an organic fertilizer. In some embodiments, methods comprise requesting the production of a report comprising the results of nutrient analysis. In some embodiments, methods comprise requesting a report comprising the results of nutrient analysis to be provided to a user of an organic fertilizer as described herein.

In some embodiments, methods comprise having an organic fertilizer analyzed. In some embodiments, methods comprise having nutrient levels measured (e.g., having the concentration, absolute amount, and/or relative amount of one or more of nitrogen, carbon, phosphorus, potassium, calcium, magnesium, sulfur, boron, chlorine, cobalt, copper, iron, manganese, molybdenum, sodium, nickel, or zinc measured) in an organic fertilizer. In some embodiments, methods comprise having a report produced comprising the results of nutrient analysis. In some embodiments, methods comprise having a report comprising the results of nutrient analysis provided to a user of an organic fertilizer as described herein.

In some embodiments, methods comprise using an organic fertilizer as described herein. In some embodiments, methods comprise receiving a report and/or analysis of nutrient levels in an organic fertilizer as described herein.

Furthermore, in some embodiments the methods comprise adjusting one or more steps of the methods described herein based on the results of analyzing an organic fertilizer or having an organic fertilizer analyzed (e.g., based on a measured concentration, absolute amount, and/or relative amount of one or more of nitrogen, carbon, phosphorus, potassium, calcium, magnesium, sulfur, boron, chlorine, cobalt, copper, iron, manganese, molybdenum, sodium, nickel, or zinc in an ADE, fertilizer intermediate, or fertilizer). In some embodiments, methods comprise adding one or more nutrients to an ADE, fertilizer intermediate, and/or fertilizer. In some embodiments, methods comprise adding one or more nutrients to an ADE, fertilizer intermediate, and/or fertilizer based on the results of analyzing an organic fertilizer or having an organic fertilizer analyzed (e.g., based on a measured concentration, absolute amount, and/or relative amount of one or more of nitrogen, carbon, phosphorus, potassium, calcium, magnesium, sulfur, boron, chlorine, cobalt, copper, iron, manganese, molybdenum, sodium, nickel, or zinc in an ADE, fertilizer intermediate, or fertilizer).

Systems

Some embodiments of the technology relate to systems for producing an organic fertilizer. For example, in some embodiments, systems comprise an anaerobic digester and a flocculant as described herein. In some embodiments, systems comprise an anaerobic digester, a primer (e.g., borate), and a flocculant (e.g., alginate) as described herein. In some embodiments, systems comprise animal waste. In some embodiments, systems comprise ADE. In some embodiments, systems comprise a component configured to remove sand from ADE prior to flocculation. In some embodiments, systems comprise microorganisms providing hydrolysis, acidogenesis, acetogenesis, and/or methanogenesis functionalities, e.g., for the anaerobic digester. In some embodiments, systems comprise filters, screens, and/or sieves; and/or a screw press, e.g., configured to remove fibers and/or fibrous materials from ADE. In some embodiments, ADE does not comprise boron, comprises an undetectable amount of boron, and/or comprises boron that is less than 0.025 to 0.25% w/v borate (e.g., less than 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250 w/v borate).

In some embodiments, systems comprise a flocculant as described herein. In some embodiments, systems comprise a primer as described herein. In some embodiments, systems comprise components configured to produce a flocculant as described herein. In some embodiments, systems comprise a coflocculant and/or a coagulant as described herein. In some embodiments, systems comprise a component configured to separate floc solids from a liquid. In some embodiments, systems comprise a component configured to remove water from floc solids. In some embodiments, systems comprise a binder and/or filler. In some embodiments, systems comprise a component configured to produce a granulated and/or pelletized fertilizer.

In some embodiments, systems comprise a microorganism providing biodegradation functionalities, e.g., to biodegrade a non-organic component and/or biodegradable flocculant from an ADE, fertilizer intermediate, or fertilizer. In some embodiments, systems comprise an incubation component configured to provide controlled temperature, pressure, agitation, and/or gas environment (e.g., comprising controlled levels of oxygen, carbon dioxide, nitrogen, and/or water vapor) for incubation of an ADE, fertilizer intermediate, or fertilizer to promote biodegradation of a non-organic component and/or biodegradable flocculant by microorganisms. In some embodiments, systems comprise components for testing (e.g., providing nutrient analysis of) ADE, fertilizer intermediates, and/or fertilizer.

Some embodiments of the technology provided herein further comprise functionalities for collecting, storing, and/or analyzing data. For example, in some embodiments, the technology comprises use of a processor, a memory, and/or a database for, e.g., storing and executing instructions, analyzing data, performing calculations using the data, transforming the data, and storing the data. Moreover, in some embodiments, a processor is configured to control one or more components of the systems described and/or to perform one or more steps of the methods described. In some embodiments, the processor is used to initiate and/or terminate a measurement, recording, and/or data collection. In some embodiments, the technology comprises a user interface (e.g., a keyboard, buttons, dials, switches, and the like) for receiving user input that is used by a processor to direct a measurement, to control a system component, and/or to perform a step of a method. In some embodiments, the technology further comprises a data output for transmitting data to an external destination, e.g., a computer, a display, a network, and/or an external storage medium.

Also provided herein are methods employing any of the systems described herein for the management of one or more aspects of fertilizer production. The methods include those processes performed by individual actors as well as collective activities of one or more actors working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as components without loss of generality. The described operations and their associated components may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Uses

In some embodiments, the technology provides a flocculant that meets NOP standards. Some embodiments relate to use of the NOP-compliant organic flocculant to manufacture a product (e.g., an organic fertilizer (e.g., a NOP-compliant fertilizer)). In some embodiments, the technology finds use in capturing nutrients from a waste stream of anaerobic digesters. In some embodiments, the technology finds use in the production of a dry fertilizer, e.g., using nutrients recovered from a waste stream of anaerobic digesters. The resulting fertilizer is economical to transport, easy to apply, with none of the restrictions associated with manure application. In some embodiments, the technology provides a fertilizer comprising homogenized nutrients and provided in granules. In some embodiments, the technology provides an organic fertilizer that provides a nutrient source for organic farmers. In some embodiments, the technology comprises providing a guaranteed nutrient analysis of a fertilizer (e.g., a granulated organic fertilizer). In some embodiments, the technology finds use to treat organic commodity field crops such as corn, wheat, edible beans and alfalfa, sold for food or feed. In some embodiments, the technology captures nitrogen and other nutrients from a dairy waste stream and makes them available to organic row crop producers who need these nutrients to expand production, their suppliers who want to sell to them, and their customers. Dairy producers, the environment, and society benefit from reduction of farm nutrients entering waterways. Excess nutrients, if they enter water resources, increase algae and bacteria growth, degrading the resource for drinking water, recreation and wildlife. In some embodiments, the technology finds use by government agencies charged with managing land, particularly those charged with using more bio-based products, and provides a new option to manage nutrients in watersheds.

EXAMPLES

During the development of embodiments of the technology provided herein experiments were conducted to identify 117 candidate flocculants, screen all candidates for flocculation, test all flocculants for biodegradability, and test promising flocculants in a Dissolved Air Flotation (DAF) tank model system. Data collected during these experiments identified flocculant materials for use in an organic process to generate fertilizer from the effluent of dairy anaerobic digesters.

Example 1

Identifying and Testing Candidate Flocculants

During the development of embodiments of the technology, candidate materials for use as flocculants were identified (e.g., by reviewing the scientific and operational literature related to water treatment and by interviewing manufacturers of water-treatment materials and individuals having experience in on-farm or industrial-scale water treatment). In addition to two conventional synthetic flocculants (polyacrylamide-based flocculants Brenntag CP9855P and TramFloc), which served as positive controls, 117 candidate materials were evaluated (Table 2). As used herein, Tram-Floc refers to a composition comprising acrylamide/acrylamidopropyltrimethylammonium chloride, 30% in water (acrylamide/aptac copolymer (1-Propanaminium,N,N,N-trimethyl-3-((1-oxo-2Propen-1-yl)amino)-, chloride(1:1), polymer with 2-propenamide); CAS No. 75150-29-7). Materials showing positive flocculation results were evaluated further (see Table 3). The candidates fell into the following groups:

Blood, proteins and gelatins (21 candidates). This category includes blood and blood derivatives, bone and tissue meals, gelatins, and other animal-derived proteins, and includes materials already sold into the ag-market with NOP approval. Blood proteins and gelatins have previously been investigated (1-6), flocculate solids under a number of conditions, and could be NOP-compliant. However, they have never been used in a DAF tank system.

Seaweed-derived (31 candidates). This category includes crude and refined algae extracts, some of which are already sold into the ag-market with NOP approval. Based on the successes seen with sodium alginate, additional materials were identified and seaweed-based materials were classed separately from other biobased materials tested.

Other biobased materials (28 candidates). This category includes soy protein hydrolysate, mucilage, and other materials that were identified through the literature or through personal communications, but are neither blood/protein/gelatin nor seaweed-derived.

Modified starches (25 candidates). This category includes both corn and potato starch-based materials commercially available for water treatment and other applications. Various vendors provided these materials. Since these materials are modified through chemical processes, they are not qualified for use in organic operations without a removal step. As starches, it was anticipated that they might have sufficient flocculation and biodegradability characteristics.

Mineral Coagulants (12 candidates). Water treatment often uses metal salts as coagulants, with or without addition of polymers. Several mineral coagulants have NOP approval for soil and crop applications when indicated by a soil or tissue test. Several of the most common materials and several materials commonly encountered in organic agriculture (e.g., rock phosphate and zeolites) that are purported to bind nitrogen and other nutrients were tested (7-12).

During the development of embodiments of the technology provided herein, all materials were assayed for performance on anaerobic digester effluent (ADE). Due to the high solids loading and complexity of ADE, materials were screened using actual wastewater. Screening employed previously developed procedures adapted for the experiments described. The screening method comprised collecting ADE (e.g., from a dairy anaerobic digester after bulk fiber removal), aliquoting the ADE, and storing (e.g., freezing) the ADE aliquots.

Before use for testing, aliquoted samples were warmed to room temperature (e.g., approximately 18 to 25° C. (e.g., approximately 18, 19, 20, 21, 22, 23, 24, or 25° C.)) and passed through a coarse (0.2-cm) screen to remove additional fibrous material. During the development of embodiments of the technology, data collected during the experiments indicated that this fiber removal step improved the assays by removing small fibers remaining after the bulk fiber removal step that could become trapped in and plug small tubing. The data collected indicated that the fiber removal step did not affect the experiment because the screening removed particles that settled from the solution without the screening step. A full-scale processing facility typically processes hundreds of thousands to millions of gallons of ADE daily. As such, the components of the processing equipment (pipes, etc.) are sufficiently large to handle the small fibers that remain following coarse fiber removal.

The candidates were screened for flocculant activity using a fixed concentration of ADE and increasing concentrations of candidate materials (0 ppm to approximately 800 ppm). In some cases, higher concentrations (e.g., up to 4%) were evaluated (e.g., based on literature reports or data collected during the experiments). All reactions were mixed at 400 rpm. If a coflocculant (e.g., ions (e.g., cations (e.g., $Ca^{2+}$))) was used, it was added next and the combination was mixed again for 5 minutes at 400 rpm. The reactions were permitted to settle for at least 1 hour. To account for variability, a conventional polyacrylamide flocculant (e.g., TramFloc) was used as a positive control. After settling, the test reactions were backlit and the opacity of the test reactions was measured. In addition, the height of the settled material was measured. For some samples, aliquots of the supernatant were collected to measure total dissolved solids (TDS) and turbidity. TDS measurement was conducted using a Sartorius MA35 moisture meter. Briefly, 2 g of supernatant solution were placed on an aluminum tray fitted with a fiberglass absorbent pad. The sample on the tray was heated at 120° C. and the percent TDS was automatically calculated using an integrated declining weight balance. Turbidity was measured using a Hach TL2360 Turbidimeter. Due to the high turbidity of the untreated ADE control, all samples were diluted before readings were made. The effectiveness of any particular treatment was calculated from turbidity as $\log_{10}$(control/treatment) where the control is the untreated ADE. To account for variability in ADE samples, each analysis was normalized to TramFloc. Fourteen materials were identified as flocculants (Table 3). The ADE tested in these experiments was from an actual digester and was 'richer' than most wastewater streams. Accordingly, data collected during the experiments described herein (e.g., use of flocculant on actual ADE) indicated that many flocculants commonly used in water treatment performed differently in the experiments reported herein than previously reported.

Example 2

Biodegradability

During the development of embodiments of the technology described herein, experiments were performed to test microbial degradation of the carbon-based candidate materials that showed positive flocculation performance. In these experiments, flocculants were used as the sole carbon source in cultures inoculated with ADE and microbial growth was monitored. A Mineral Salts Medium (MSM) comprising micronutrients was mixed following a protocol modified from Chang (13). A 50-ml volume of MSM was added to a 250-ml flask and the candidate flocculant (carbon source) was added to a total concentration of 1%. This solution was then inoculated with 50 μl of unfiltered ADE. A negative control comprising ADE without a carbon source was prepared and cultured and a positive control comprising ADE and glucose at 0.1% was prepared and cultured. Cultures were placed in a shaker-incubator at 35° C. and 150 rpm. Measurements of microbial growth were taken on days 1, 3 and 10 after inoculation. Table 3 lists the materials that functionally served to flocculate the ADE, whether additional cations (e.g. $Ca^{2+}$) improved flocculation, their effective dose range, and whether the materials can be degraded by the organisms present in the effluent.

TABLE 2

Screening results for candidate materials

| Flocculant/Coagulant | Flocculated in screening assay? | Requires additional cation? | Biodegradable? |
|---|---|---|---|
| Synthetic-Polyacrylamide Based These materials served as positive controls. | | | |
| Brenntag CP9855P | Yes | No | No |
| TramFloc | Yes | No | No |
| Blood, Proteins and Gelatins | | | |
| Blood Meal, Chicken | No | nt | nt |
| Collagen Hydrolysate Powder | No | nt | Yes |
| Dried Egg White Powder | No | nt | Yes |
| Gelatin Hydrolysate Powder | No | nt | Yes |
| Gelatin, Beef | No | nt | Yes |
| Gelatin, Knox Commercial | No | No | Yes |
| Hemoglobin, Bovine | No | nt | Yes |
| Hemoglobin, Porcine | No | nt | Yes |
| Hemoglobin, Chicken | Yes | No | Yes |
| High Yield Bone Meal | No | nt | Yes |
| Methylated Hemoglobin, Chicken | Yes | nt | Yes |
| Methylated Hemoglobin, Bovine | No | No | Yes |
| Methylated Hemoglobin, Porcine | No | No | Yes |
| Methylated Natures Safe 15-1-1 | No | nt | Yes |
| Natures Safe 15-1-1 | No | nt | Yes |
| Polymerized Blood | No | nt | No |
| Porcine Blood Meal (15-0-1) | No | nt | Yes |
| Whole Blood, Bovine | No | nt | Yes |
| Methylated Whole Blood, Bovine | No | nt | Yes |
| Whole Blood, Chicken | Yes | nt | Yes |
| Methylated Whole Blood, Chicken | Yes | nt | Yes |

TABLE 2-continued

Screening results for candidate materials

| Flocculant/Coagulant | Flocculated in screening assay? | Requires additional cation? | Biodegradable? |
|---|---|---|---|
| Seaweed-Derived Flocculants | | | |
| Acid Treated Dulse | No | No | nt |
| Acid Treated Kombu | No | No | nt |
| Acid Treated Alaria (wakame) | No | No | nt |
| Acid Treated H$_2$O life Brown Seaweed (kombu) | No | No | nt |
| Agar Agar Powder | No | No | nt |
| Alginic Acid | Yes | Yes | No |
| Ascophyllum Nodosum | No | Yes | Yes |
| Calcium Alginate | Yes | Yes | Yes |
| Carrageenan, Iota | Yes | Yes | No |
| Carrageenan, Kappa | No | No | No |
| Carrageenan, Lambda | No | No | Yes |
| Crude, Homogenized Alaria (wakame) | No | No | nt |
| Crude, Homogenized Dulse | No | No | nt |
| Crude, Homogenized H$_2$O life Brown Seaweed | No | No | nt |
| Crude, Homogenized Kombu | No | No | nt |
| EfficienSea | No | No | No |
| IT1401 | No | No | Yes |
| IT1402 | No | No | Yes |
| Kelp Powder | No | Yes, Ca$^{2+}$ | No |
| KelPak | No | Yes, Ca$^{2+}$ | No |
| Neutralized, Acid Treated Dulse | No | Yes, Ca$^{2+}$ | nt |
| Neutralized, Acid Treated Kombu | Yes | Yes, Ca$^{2+}$ | nt |
| Neutralized, Acid Treated Alaria | Yes | Yes, Ca$^{2+}$ | nt |
| Neutralized, Acid Treated H$_2$O life Brown Seaweed | No | Yes, Ca$^{2++}$ | nt |
| Polygalacturonic Acid | Yes | Yes, Ca$^{2+}$ | Yes |
| Seaweed Powder, Growers Secret | No | Yes, Ca$^{2+}$ | No |
| Sodium Alginate | Yes | Yes, Ca$^{2+}$ | No |
| Washed, Neutralized, Acid Treated Dulse | No | nt | nt |
| Washed, Neutralized, Acid Treated Kombu | Yes | Yes, Ca$^{2+}$ | nt |
| Washed, Neutralized, Acid Treated Alaria (wakame) | Yes | Yes, Ca$^{2+}$ | nt |
| Washed Neutralized, Acid Treated H$_2$O life Brown Seaweed | No | nt | nt |
| Other Flocculants | | | |
| AgriLife 10.5-1.5-2.5 | No | nt | Yes |
| Aloe Vera Gel | No | nt | No |
| AminoAcid Vitamin Base Fert w/Boron | No | nt | No |
| AminoAcid Vitamin Base Fert w/Cu | No | nt | Yes |
| AminoAcid Vitamin Base Fert w/Fe | No | nt | Yes |
| AminoAcid Vitamin Base Fert w/Mg | No | nt | Yes |
| AminoAcid Vitamin Base Fert w/Mn | No | nt | No |
| AminoAcid Vitamin Base Fert w/Zn | No | nt | Yes |
| AminoVitCa 5-0-0 | No | nt | No |
| Chia seeds | No | No | No |
| Chitosan Powder | No | n/a | No |
| Corn Syrup | No | nt | Yes |
| Dry Lignin | No | nt | Yes |
| Fenugreek Mucilage | No | nt | No |
| Galactan | No | nt | Yes |
| Gar Gum | No | nt | Yes |
| Grower's Secret 14-0-0 | No | nt | No |
| Karanga Cake | No | nt | No |
| Locust Bean Gum | No | nt | Yes |
| M. Oleiferna Seeds/Presscake | No | nt | No |
| Natto | No | nt | No |
| Neem Cake | No | nt | No |
| Plantago Psyllium/Psyllium Husk | No | nt | Yes |
| Prickley Pear Extract | No | nt | No |
| Tannins | No | nt | No |
| Tapioca Flour | No | nt | No |
| Yucca Extract | No | nt | No |
| Industrial Starch-Based | | | |
| Cargill 5050 | No | No | Yes |
| Cargill D | No | No | Yes |
| Cargill Ex-90 | No | No | No |
| Cargill Ex-91 | No | No | Yes |
| Charge + 310 | No | No | Yes |
| Dura-Jel | No | No | No |
| Fiberstar C | No | No | Yes |
| Fiberstar CX | No | No | Yes |
| Fiberstar P | No | No | Yes |
| GlucoPlus C + 2P | No | No | Yes |
| GlucoPlus C + 3P | No | No | Yes |
| Glucostar 1030 | No | No | No |
| HPMC-H10,000 | No | No | No |
| InterBond C | No | No | No |
| Lifeline 5305 | Yes | Yes | No |
| STA-LOK 120 | No | No | Yes |
| STA-LOK 190 | No | No | No |
| Sta-Lok 330 | No | No | Yes |
| Staramic 105 | No | No | Yes |
| Staramic 747 | No | No | Yes |
| Starbond 140 | No | No | Yes |
| Starfloc | No | No | No |
| StarPol 136 | No | No | Yes |
| StarPol 469 | No | No | Yes |
| StarPol 600 | No | No | Yes |
| Minerals and Mined Coagulants | | | |
| Aluminum Chloride | No | n/a | n/a |
| Aluminum Sulfate/Alum | No | n/a | n/a |
| Bentonite | No | n/a | n/a |
| Calcium Chloride | No | n/a | n/a |
| Iron (II) Chloride | No | n/a | n/a |
| Iron (II) Sulfate | Yes | n/a | n/a |
| Iron (III) Sulfate | Yes | n/a | n/a |
| Polymerized Iron Sulfate | Yes | n/a | n/a |
| Sparkolloid Powder | No | n/a | n/a |
| TBR Rock Phosphate | No | n/a | n/a |
| Zeolite Powder, 90-92% Clinptilolite | No | n/a | n/a |
| Zeolite Powder, Bear River | No | n/a | n/a |

Table 2 summarizes the screening results for all materials tested (nt=not tested).

TABLE 3

Flocculant activity and biodegradability

| Material | Flocculant Class | Flocculation Effectiveness | Effective Range | Flocculation improved by cation? | Biodegradable? |
|---|---|---|---|---|---|
| Methylated hemoglobin | BPG | +++ | 700-1400 ppm | No | +++ |
| Whole blood, chicken | BPG | + | 900-3000 ppm | No | +++ |
| Alginic acid | Seaweed | ++ | 200-400 ppm | Yes, $Ca^{2+}$ | − |
| Calcium alginate | Seaweed | + | 200-950 ppm | No | + |
| Carrageenan, Iota | Seaweed | + | 600-800 ppm | No | − |
| Grower's Secret seaweed powder | Seaweed | + | 650-800 ppm | Yes, $Ca^{2+}$ | − |
| Kelpak | Seaweed | + | 0.5-0.7% | Yes, $Ca^{2+}$ | − |
| Kelp powder | Seaweed | + | 650-800 ppm | Yes, $Ca^{2+}$ | − |
| Polygalacturonic acid | Seaweed | ++ | 500-700 ppm | Yes, $Ca^{2+}$ | +++ |
| Sodium alginate | Seaweed | +++ | 192-1500 ppm | Yes, $Ca^{2+}$ | − |
| Lifeline 5305 starch | Modified starch | + | 750-1550 ppm | Yes, $Ca^{2+}$ | − |
| Iron (II) sulfate | Mineral | +++ | 1-3% | No | n/a-Mineral |
| Iron (III) sulfate | Mineral | +++ | 0.5-0.8% | No | n/a-Mineral |
| Polymerized iron sulfate | Mineral | +++ | 0.5-1% | No | n/a-Mineral |

Table 3 lists flocculant materials identified by the screening assays and the biodegradability of the materials.
BPG = Blood/protein/gelatin.
Flocculation performance, relative to conventional polyacrylamide polymer, is given by the following efficiency scale:
+ = performs with less efficiency than conventional polyacrylamide polymer;
++ = performs as well as conventional polyacrylamide polymer;
+++ = performs better than conventional polyacrylamide polymer.
The rate of biodegradability is given by the following scale:
+ = degrades within 10 days;
++ = degrades between 3 and 9 days;
+++ degrades within 3 days;
− indicates that no degradability was noted within 10 days.

Example 3

Measuring Performance Metrics of Flocculation Materials

In some embodiments, technical feasibility was assessed based on several factors, e.g., (1) ability to meeting NOP guidelines and (2) flocculation efficiency (e.g., nutrient capture efficiency). During the development of embodiments of the technology provided herein, data collected from experiments identified 14 material having flocculant activity: 3 mineral (iron) based materials, 2 blood-based materials, 1 modified industrial starch, and 8 seaweed-based materials. Most of these (e.g., 13 of the 14) materials have pathways to NOP approval, although the regulatory hurdles are lower for some than other.

During the development of embodiments of the technology provided herein, animal-sourced products were identified and screened. Data collected during these experiments indicated that whole chicken blood and methylated hemoglobin performed well in the initial screen. Subsequently, methylated hemoglobin was screened in a larger-scale lab-DAF system (Table 4). In addition, the blood products all showed biodegradability in the screening assay (Tables 2 and 3).

TABLE 4

Nutrient capture efficiency of methylated hemoglobin

| Collection Efficiency (calculated) | TramFloc 25 ppm | MeHb 600 ppm 7.3% $Fe^{3+}$ | MeHb 1500 ppm pH = 5 |
|---|---|---|---|
| Total N | 35% | 32% | 50% |
| Organic N, calc | 40% | 36% | 55% |
| Ammonium N | 29% | 26% | 42% |
| Total $P_2O_5$ | 100% | n.d. | n.d. |
| P, total | 100% | n.d. | n.d. |
| Total $K_2O$ | 26% | 24% | 40% |
| K, total | 26% | 24% | 39% |
| Sulfur, total | 100% | n.d. | n.d. |
| Calcium, total | 40% | 54% | 50% |
| Magnesium, total | 39% | 28% | 37% |
| Sodium, total | 26% | 26% | 42% |
| Chloride, total | 29% | 28% | 47% |
| Manganese, total | 100% | n.d. | n.d. |
| Copper, total | 100% | n.d. | n.d. |
| Zinc, total | 27% | n.d. | 100% |
| Iron, total | 100% | 93% | 100% |
| Carbon, Total | 79% | 55% | 52% |

TABLE 4-continued

Nutrient capture efficiency of methylated hemoglobin

| Collection Efficiency (calculated) | TramFloc 25 ppm | MeHb 600 ppm 7.3% $Fe^{3+}$ | MeHb 1500 ppm pH = 5 |
|---|---|---|---|
| OM (Loss on Ignition) | 79% | 55% | 52% |
| Ash | 60% | 45% | 47% |

Methylated hemoglobin was evaluated, using filtered digestate, with the addition of an iron-coflocculant and on acidified ADE.
Under these conditions, the MeHb performed well in comparison to the conventional polyacrylamide flocculant (e.g., TramFloc).
Some analyses are not available because the ADE used in the studies underwent additional filtering.

The blood-based products provide a flocculant for use in the present technology because they are biodegradable despite being chemically processed. In some embodiments, modified blood products are purified (e.g., cleanup required following the methylation reaction) to improve flocculation. In some embodiments, cations are added to the flocculant to improve flocculation.

Seaweed and seaweed-derived materials are relatively common in the agricultural industry, with several NOP-compliant seaweed powders available. Accordingly, during the development of embodiments of the technology provided herein, experiments were performed to compare seaweed and seaweed-derived materials (e.g., refined seaweed extracts (e.g., alginates, agar, carrageenan)). Data collected during these experiments indicated that a flocculant comprising an alginate and a flocculant comprising an alginate and a cation efficiently captured nutrients from ADE. Using this information, experiments were conducted to measure the nutrient capture efficiency of refined, food-grade sodium alginate to characterize a maximal efficiency for alginates (Table 5).

TABLE 5

Nutrient capture efficiency of refined sodium alginate

| Collection Efficiency (calculated) | TramFloc 25ppm | Na-Alg 1500 ppm + 4% Ca | Na-Alg 800 ppm + 4% Ca |
|---|---|---|---|
| Total N | 35% | 44% | 23% |
| Organic N, calc | 40% | 57% | 24% |
| Ammonium N | 29% | 30% | 20% |
| Total $P_2O_5$ | 100% | 100% | 100% |
| P, total | 100% | 100% | 100% |
| Total $K_2O$ | 26% | 28% | 20% |
| K, total | 26% | 28% | 20% |
| Sulfur, total | 100% | 100% | 100% |
| Calcium, total | 40% | 36% | 28% |
| Magnesium, total | 39% | 54% | 32% |
| Sodium, total | 26% | 28% | 19% |
| Chloride, total | 29% | 86% | 20% |
| Manganese, total | 100% | 100% | 100% |
| Copper, total | 100% | 100% | 100% |
| Zinc, total | 27% | 100% | 100% |
| Iron, total | 100% | 100% | 100% |
| Carbon, Total | 79% | 24% | 31% |
| OM (Loss on Ignition) | 79% | 58% | 37% |
| Ash | 60% | 38% | 26% |

The sodium alginate at high concentrations, with additional calcium chloride added, captured equivalent or greater amounts of desirable nutrients (e.g., total N, P, K, S, Ca, Mg, Mn, Cu, Zn) than a conventional polyacrylamide flocculant (e.g., TramFloc).
In some embodiments, minimizing the dose while maintaining high capture efficiencies provides a greater economic benefit of this process.

Figure 2A:
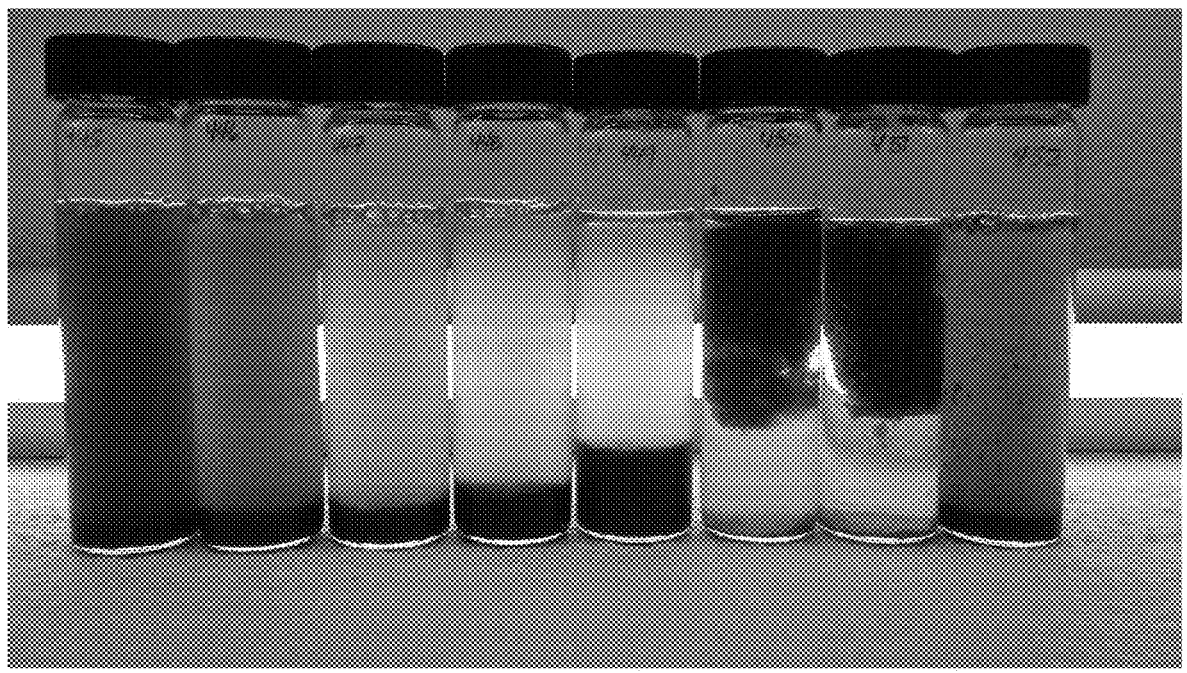
FIG. 2A shows a photograph of samples used to measure the effectiveness of sodium alginate plus 1% calcium to clear turbidity from ADE comprising 1% w/v solids. From left to right, no alginate, 38.5 ppm alginate, 77 ppm alginate, 192 ppm alginate, 385 alginate, 770 ppm alginate, and 1540 ppm alginate. The far right sample comprises a conventional polyacrylamide flocculant (e.g., TramFloc).
Figure 2B:
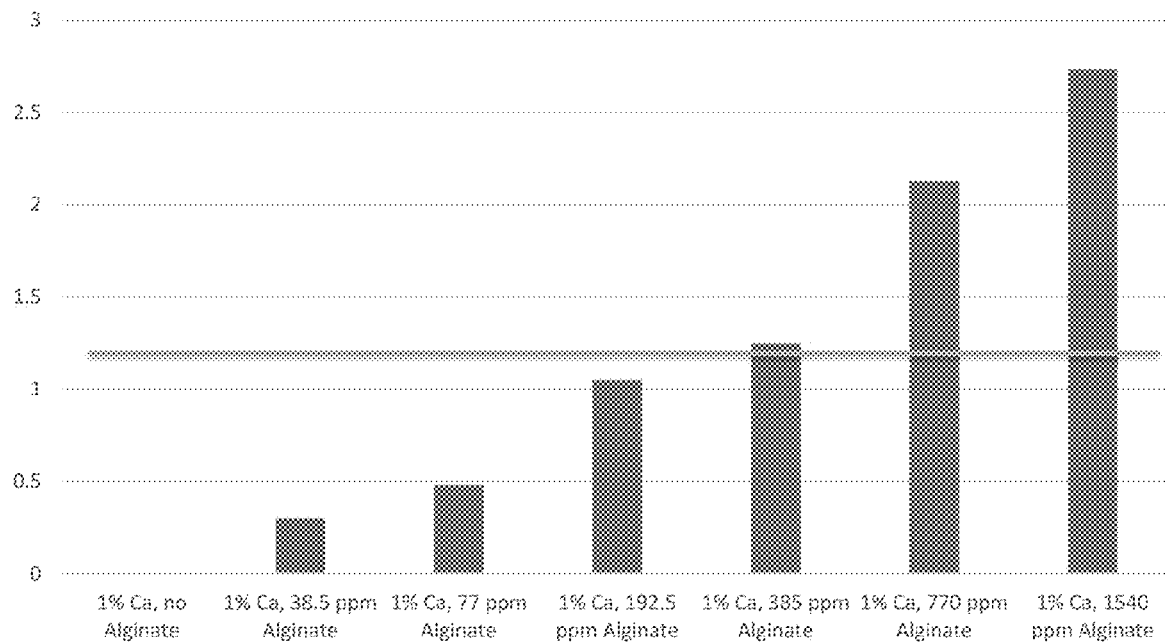
FIG. 2B is a bar plot showing the effectiveness of sodium alginate plus 1% calcium to clear turbidity from ADE comprising 1% w/v solids relative to a conventional polyacrylamide flocculant (e.g., TramFloc). The effectiveness of the conventional polyacrylamide flocculant is represented as the horizontal line. At alginate doses greater than approximately 200 ppm, the sodium alginate/calcium treatment performed better than the conventional flocculant.

Next, during the development of embodiments of the technology described herein, experiments were conducted to evaluate the effectiveness of clarifying ADE using the alginates relative to the conventional polyacrylamide flocculant (e.g., TramFloc). The data indicated that different calcium concentrations affected the alginate dosing. Further, the data indicated that a flocculant comprising approximately 200 ppm sodium alginate and 1% calcium ion improved the clarity of the solutions (e.g., reduced turbidity) similarly or better than the conventional polyacrylamide flocculant (e.g., TramFloc) (FIGS. 2A and 2B).

Alginates (which, in some embodiments, are refined from seaweeds) are listed as NOP synthetics allowed in food products. However, alginates are not currently permitted for agricultural use. Further, food-grade alginates are not economical to use in an ag-manufacturing. However, in some embodiments, crude alginate preparations are made using materials and processes compliant with NOP standards.

Figure 3:
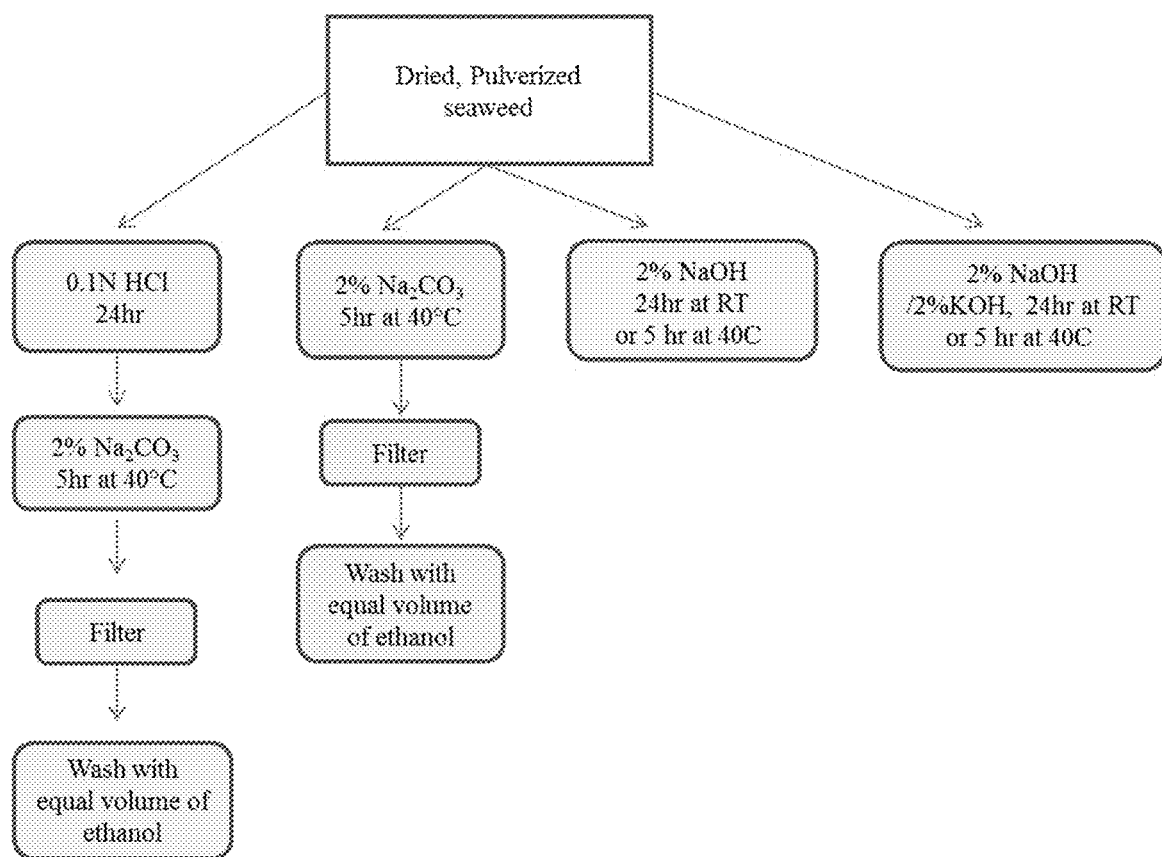
FIG. 3 is a schematic drawing showing embodiments of methods for producing seaweed-based products from seaweed, e.g., comprising processing steps for extracting and refining alginates from seaweeds. Four processes for extracting alginates from seaweeds were evaluated. For multi-step processes, aliquots from each step were taken and evaluated for flocculation performance. Cruder flocculant preparations provide improved economics of the process.

Data collected during the experiments indicated that some of the seaweed-based materials tested were more refined than others. Accordingly, it was contemplated that purity of the seaweed product(s) could be associated with the efficiency of flocculation. During the development of embodiments of the technology provided herein, experiments were conducted to evaluate the process of producing seaweed-based products from seaweed (see FIG. 3). In particular, experiments were conducted in which seaweed was fractionated and fractions were tested for their flocculating ability. In some experiments, calcium chloride was used as a coagulant/coflocculant (e.g., at a final concentration of 3%).

Data collected during these experiments indicated that extraction of sodium alginate produced fractions that were too viscous to filter. Accordingly, none of the filtered fractions where tested for flocculant activity. Data collected during these experiments indicated that seaweed treated with mineral acid (HCl) did not have flocculant activity. Data collected during these experiments indicated that a fraction that was treated with acid and subsequently treated with sodium carbonate (e.g., soda ash) provided half the flocculating ability of other fractions. Data collected during these experiments indicated that sodium alginate extracted from seaweed using sodium carbonate, sodium hydroxide, or potassium hydroxide captured similar amounts of solids (Table 6).

TABLE 6

Solid capture from ADE using Atlantic Kombu extracts

| Seaweed Extraction Process Fraction | Solids in Resulting Cake (%) |
|---|---|
| HCl followed by $Na_2CO_3$ | 7.1 |
| $Na_2CO_3$ | 13.8 |
| NaOH | 13.0 |
| KOH | 11.1 |

In addition, experiments were conducted during the development of embodiments of the technology described herein to screen various seaweed types (e.g., green, brown, red). Data collected during these experiments indicated that brown seaweed performed the best (see also 14, 15). Additionally, experiments were conducted during the development of embodiments of the technology described herein to test various commercially available genera and species of brown seaweed. Data collected during these experiments indicated that alginate extracted from Atlantic Kombu (*Laminaria digitata*) performed the best.

In some embodiments, flocculation by the seaweed-based products was improved by adding a cation (e.g., a divalent cation). Experiments were conducted during the development of embodiments of the technology to test iron, calcium, and magnesium for improving flocculation. Data collected during these experiments indicated that calcium performed best.

Corn and potato starch are commercially available in chemically modified forms and are used for water treatment, papermaking, and other industrial applications. They are produced via chemical processes, so cannot be used in organic applications without a removal step. Accordingly, embodiments of the technology comprise use a biodegradable starch. During the development of embodiments of the technology, twenty-five starches were obtained and test. Data collected from these experiments indicated that one starch (Lifeline 5305) had flocculant activity in ADE in the presence of calcium chloride, but the starch was not biodegradable.

Water treatment often uses metal salts as coagulants, with or without the addition of polymers. Several salts are NOP approved for soil and crop applications when indicated by a soil or tissue test. During the development of embodiments of the technology, experiments were conducted to test several salts, e.g., common salts, salts commonly encountered in organic agriculture (e.g., rock phosphate and zeolites), and salts that are purported to bind nitrogen and other nutrients (10-12). Data collected from these experiments indicated that iron sulfates provided reasonable flocculation performance and good nutrient capture efficiency (see Table 7). However, treatment with some iron sulfates exhibited some limitations. First, the reaction was vigorous, resulting in foaming and fizzing that could be difficult to handle on an industrial scale. More limiting, however, was that large amounts of iron were detected in the water following treatment with iron sulfates. Finally, the flocculent produced was weak and could not be easily dewatered. In some embodiments of the technology, dewatering is a key step in the manufacture of granulated fertilizer products as disclosed herein. In some embodiments, iron sulfates are not used as flocculants alone but, in some embodiments, iron sulfates find use as co-factors to improve flocculation by other flocculants, e.g., alginates and methylated hemoglobin.

TABLE 7

Nutrient capture efficiency of iron sulfates

| Collection Efficiency (calculated) | TramFloc 25 ppm | 3% Iron (III) Sulfate | 5% Iron (III) Sulfate | 2% PolyIron |
|---|---|---|---|---|
| Total N | 35% | 47% | 44% | 45% |
| Organic N, calc | 40% | 56% | 54% | 63% |
| Ammonium N | 29% | 33% | 33% | 24% |
| Total P$_2$O$_5$ | n/a | n/a | n/a | n/a |
| P, total | 100% | 100% | n.d | n.d |
| Total K$_2$O | 100% | 100% | n.d | n.d |
| K, total | 26% | 38% | 33% | 25% |
| Sulfur, total | 26% | 38% | 33% | 25% |
| Calcium, total | 100% | 100% | 100% | 44% |
| Magnesium, total | 40% | 39% | 25% | 47% |
| Sodium, total | 39% | 44% | 39% | 27% |
| Chloride, total | 26% | 34% | 30% | 22% |
| Manganese, total | 29% | 38% | 38% | 24% |
| Copper, total | 100% | 100% | 100% | 100% |
| Zinc, total | 100% | 100% | 100% | 100% |
| Iron, total | 27% | 42% | 38% | 100% |
| Carbon, Total | n/a | n/a | n/a | n/a |
| OM (Loss on Ignition) | 100% | 100% | 100% | 21% |
| Ash | 79% | 100% | 100% | 87% |

The iron compound captured equivalent or greater amounts of desirable nutrients than a conventional polyacrylamide flocculant (e.g., TramFloc)..

Example 4

Flocculant Testing in DAF-Scale Models

During the development of embodiments of the technology, experiments were conducted using a laboratory-scale DAF (Philips & Bird Jar Tester/Platypus DAF) to test promising candidates on a larger scale. To minimize and/or eliminate hindrance and/or blocking of liquid flow through small tubing, the ADE was filtered through a #18 mesh screen prior to testing. Six treatments and two controls were tested (Table 8). Data collected from these experiments indicated that methylated hemoglobin had flocculant activity, e.g., in the presence of trivalent iron and/or in acidified ADE. Furthermore, two food-grade alginate concentrations were tested with calcium ion. One starch (Lifeline 5305) and a polymerized form of iron sulfate were also tested. Conventional polyacrylamide flocculant (e.g., TramFloc) served as a positive control. Data collected from these experiments indicated that four of the six flocculants tested outperformed the conventional flocculation method, e.g., in terms of reducing turbidity. The floc and the wastewater were collected for mass-balance measurements, nutrient capture efficiency, and economic modeling purposes.

TABLE 8

Flocculant reactions using bench-scale DAF

| Treatment(s) | Reaction Temp (Celsius) | Turbidity of Diluted Waste Water | Percent Reduction in Turbidity | Effectiveness |
|---|---|---|---|---|
| 7300 ppm FeCl$_3$ with 600 ppm methylated hemoglobin | 17 | 15.9 | 96% | 1.45 |
| ADE brought to pH 5 with acetic acid then methylated | 19 | 113 | 75% | 0.595 |
| 800 ppm Food Grade Sodium Alginate with 4% CaCl$_2$ | 19 | 69.3 | 84% | 0.808 |
| 1500 ppm Food Grade Sodium Alginate with 4% CaCl$_2$ | 19 | 49.5 | 89% | 0.954 |
| 600 ppm Lifeline 5305 modified starch with 4% CaCl$_2$ | 100 | 150 | 66% | 0.472 |

TABLE 8-continued

Flocculant reactions using bench-scale DAF

| Treatment(s) | Reaction Temp (Celsius) | Turbidity of Diluted Waste Water | Percent Reduction in Turbidity | Effectiveness |
|---|---|---|---|---|
| 2% Poly-Iron Sulfate | 19 | 12.6 | 97% | 1.55 |
| 20 ppm Tramfloc, positive control | 17 | 79.3 | 82% | 0.749 |
| Negative Control | 19 | 445 | n/a | n/a |

Figure 4A:
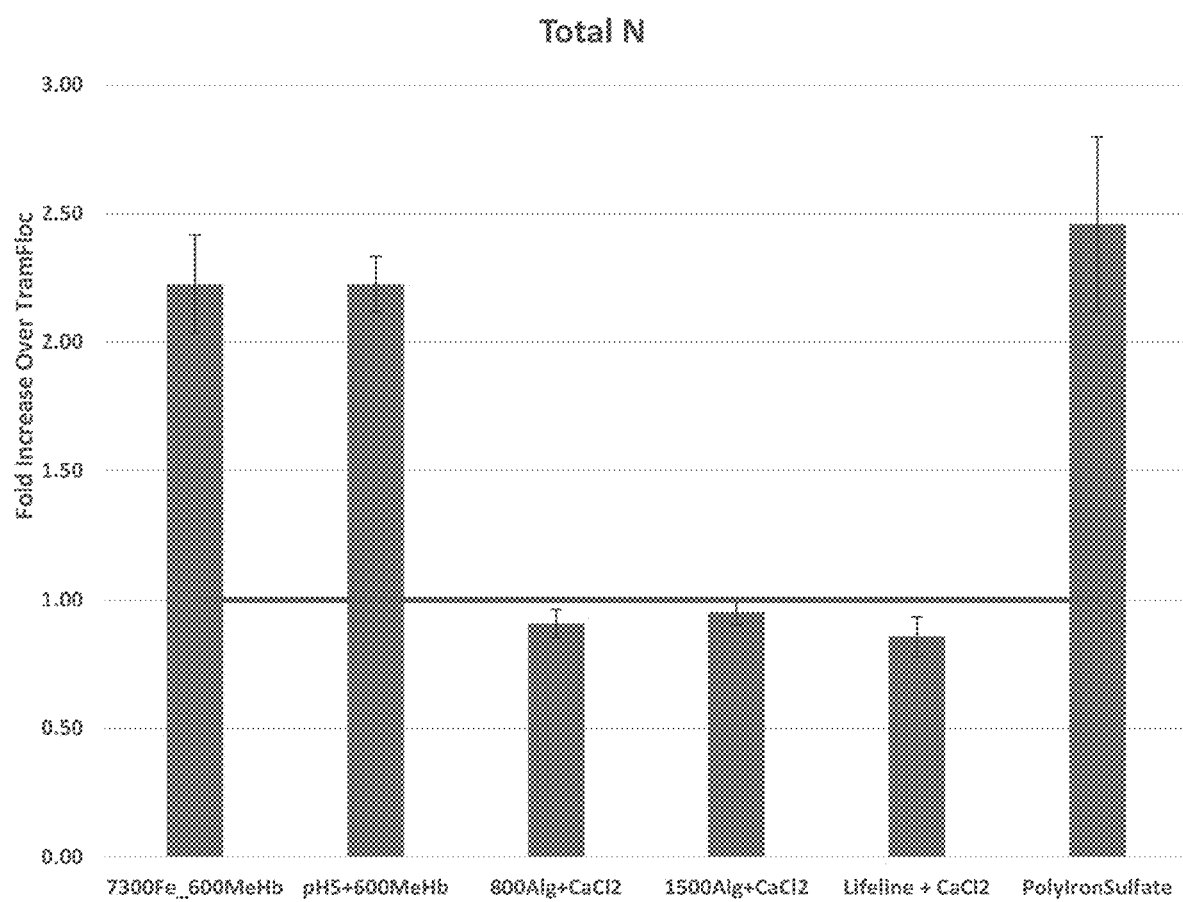
FIG. 4A, FIG. 4B, and FIG. 4C are bar plots showing the calculated capture efficiency of experimental flocculants from ADE comprising 1% w/v solids relative to a conventional polyacrylamide flocculant (TramFloc) (horizontal line). All candidate flocculants tested perform as well or better than the conventional polyacrylamide flocculant when capturing nitrogen. With the exception of treatment of pre-acidified ADE with methylated hemoglobin (MeHb), all flocculants perform as well or better than the conventional polyacrylamide flocculant in capturing potassium ($K_2O$) and organic matter.
Figure 4B:
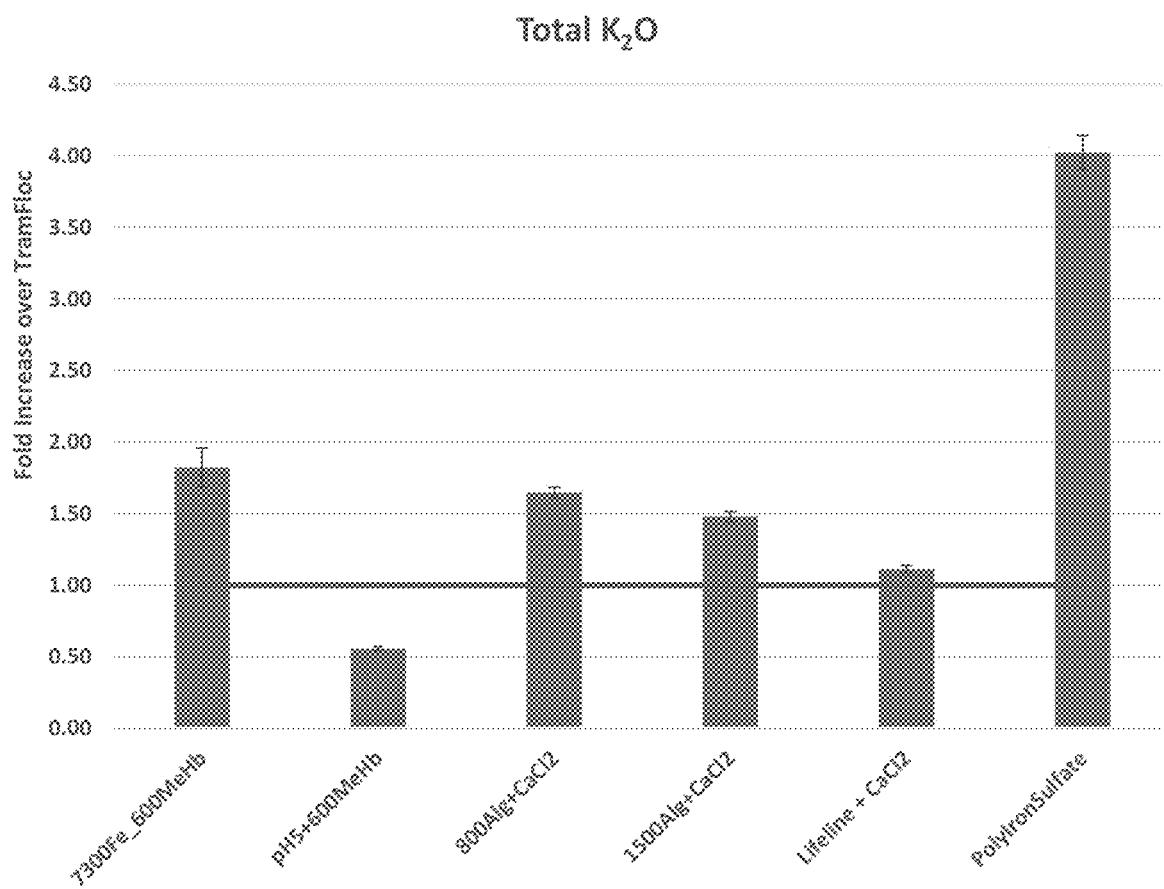
Figure 4C:
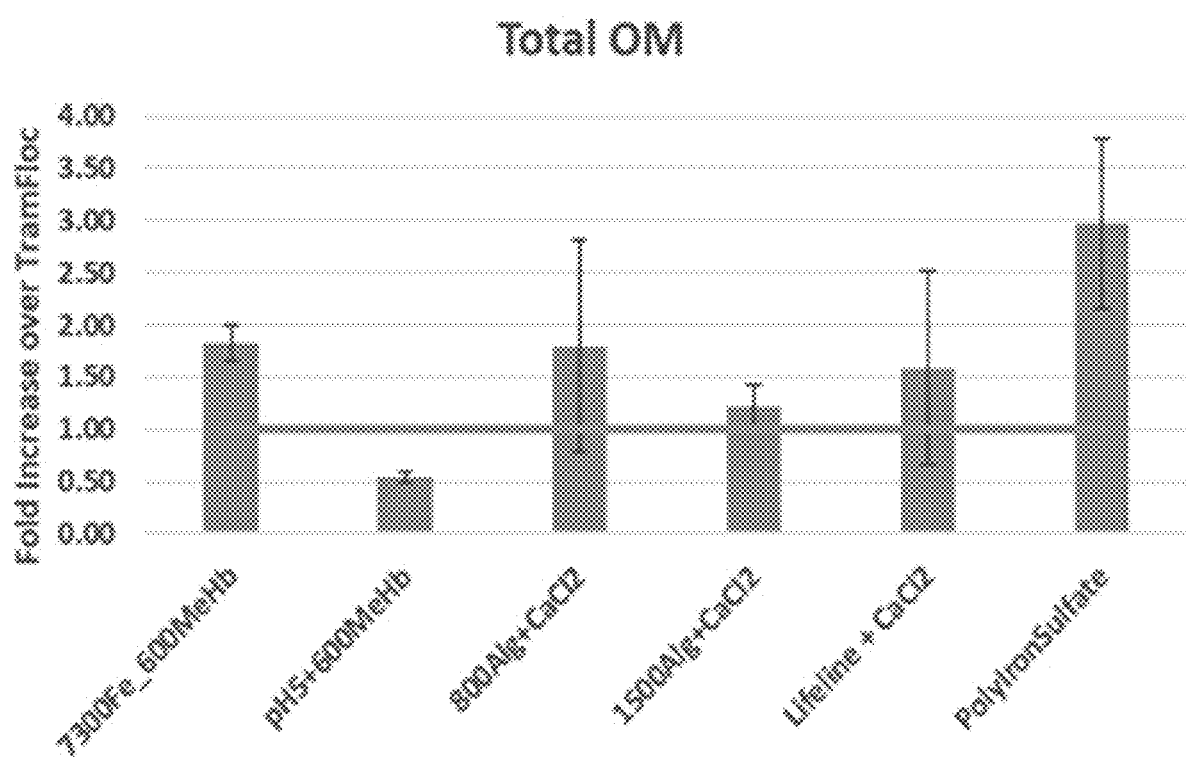

The effectiveness of a given treatment is calculated using the formula:
$\log_{10}(\text{control/treatment})$ The calculated nutrient capture efficiencies (N, $K_2O$, and total organic matter ("OM")) for the candidate flocculants (listed in the Table 5 column labeled "Treatment(s)") are shown in FIGS. 4A, 4B, and 4C, respectively. These data are plotted relative to the nutrient capture efficiency provided by a conventional polyacrylamide flocculant (e.g., TramFloc), which is represented by the horizontal line. All candidate flocculants tested perform as well as, or better than, the conventional polyacrylamide flocculant for capture of nitrogen. With the exception of methylated hemoglobin treatment of pre-acidified ADE, all flocculants perform as well or better than the conventional polyacrylamide flocculant for capture of potassium ($K_2O$) and organic matter (in the fertilizer industry, potassium and phosphorous values are presented as the oxides). The reduction in capture efficiency of potassium in acidified ADE was expected because acidification alters the solubility of the various ions in the ADE. Results for $P_2O_5$ are not shown because filtering the digestate to prevent clogging the bench-scale DAF setup has been shown also to remove sufficient phosphorous from the sample to result in a sample comprising an undetectable level of phosphorous.

Example 5

Producing a Granulated Fertilizer Using Seaweed-Derived Flocculant

During the development of embodiments of the technology provided herein, experiments were conducted to test an end-to-end feasibility test. In particular, ADE was flocculated using a combination of sodium hydroxide-treated Atlantic Kombu (harvested in Maine, USA) seaweed and mined gypsum. After treatment with flocculant, the resulting floc was gravity-dewatered using an 18-mesh strainer and then dried. The captured nutrients were homogenized using an electric burr mill (coffee grinder), combined with Organic Materials Review Institute (OMRI)-approved fertilizer nutrients, and granulated using a stand mixer (Kitchen Aid) fitted with a heat gun. The resulting granules were dried at 60° C. overnight and screened to remove over-sized and under-sized granules.

Figure 5:
FIG. 5 is a photograph of an embodiment of fertilizer granules produced using lab-produced crude alginate and mined gypsum.

This procedure provides a technology (e.g., or a model of a technology) for producing a granulated fertilizer in a full-sized plant. Further, applying the procedure to existing non-organic materials provides a technology (e.g., or a model of a technology) for producing high-quality products currently manufactured at-scale. The resulting product is shown in FIG. 5. Experiments were conducted during the development of the granulated fertilizer technology to analyze the fertilizer content. The data from these experiments indicated that the granulated fertilizer comprised 7.0% N, 2.5% $P_2O_5$ (total), 0.5% $P_2O_5$ (available), 1.5% $K_2O$, 9.5% Ca, 0.6% Mg, and 9.5% S.

The high calcium level results from inclusion of gypsum in the flocculation and granulation step. In some embodiments, the calcium levels are reduced, e.g., for some applications.

Example 6

Production of Alginate Flocculant from Brown Algae

During the development of embodiments of the technology described herein, experiments were conducted to produce an alginate flocculant from seaweed. In particular, a plurality of seaweed species (e.g., brown algae (e.g., *Laminaria digitata, Ascophyllum nodosum, Macrocystis pyrifera*, etc.)) were treated with sodium hydroxide to produce an alginate flocculant from the seaweed. A concentrated (e.g., stock) alginate flocculant was prepared comprising approximately 4 to 10% seaweed and 1 to 4% NaOH.

First, dried seaweed was ground using a combination of electric grinders and/or mortar and pestle to a size of approximately 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh). The ground dried seaweed was screened using sieves of various mesh sizes (e.g., 25 to 200 mesh (e.g., 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 mesh)) to obtain an appropriate particle (e.g., mesh) size and amount of ground seaweed for preparing the alginate flocculant. To avoid fractionation of the seaweed, the selected portion of seaweed was ground completely to the required mesh size, leaving no portion of seaweed unground.

Next, a concentrated (e.g., approximately 4% to 10% w/v (e.g., 3.5, 4.0, 4.5, 5.0, 5.5, 6.0, 6.5, 7.0, 7.5, 8.0, 8.5, 9.0, 9.5, 10.0, 10.5, or 11.0% w/v)) alginate flocculant solution was produced by treating the seaweed with NaOH. A concentrated (e.g., 1% to 4% w/v (e.g., 1.0, 1.5, 2.0, 2.5, 3.0, 3.5, 4.0, 4.5, 5.0% w/v)) NaOH solution was prepared by dissolving NaOH in water sourced from the digester. Then, an appropriate amount of ground seaweed produced above was added to the NaOH solution to provide a concentration of seaweed in the NaOH solution of approximately 4% to 10% w/v (e.g., 3.5, 4.0, 4.5, 5.0, 5.5, 6.0, 6.5, 7.0, 7.5, 8.0, 8.5, 9.0, 9.5, 10.0, 10.5, or 11.0% w/v). The resulting solution was mixed thoroughly and the extraction process was allowed to complete overnight (e.g., for at least 8, 9, 10, 11, 12, 13, 14, 15, or 16 hours) at approximately 100 rotations per minute (rpm) (e.g., approximately 50, 60, 70, 80, 90, 100, 110, 120, 130, 140, 150, 160, 170, 180, 190, or 200 rpm) in a Forma Scientific Model 4518 orbital shaker at ambient temperature (e.g., at least 18, 19, 20, 21, 22, 23, 24, or 25 degrees C.). The resulting concentrated (e.g., stock) alginate extract was diluted using water from the digester to concentrations of approximately 0.1 to 0.5% w/v (e.g., 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 w/v) or approximately 1000 to 5000 ppm (e.g., 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, or 5500 ppm) for use as a flocculant according to the technology described herein.

Example 7

Priming and Flocculating ADE

During the development of embodiments of the technology described herein, experiments were conducted to test methods comprising priming (e.g., with boron (e.g., borate)) anaerobic digester effluent prior to flocculating solids for fertilizer production. Exemplary embodiments of methods comprise a specific sequence of priming, conditioning, and flocculating steps for treating an anaerobic digester effluent (ADE) (e.g., a biodigested dairy manure slurry) comprising a wide range of concentrations of total solids (% TS) (e.g., 1 to 5% w/v (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0%)) and a wide range of pH values at a wide range of temperatures (e.g., 110 to 150° C. (e.g., 100, 105, 110, 115, 120, 125, 130, 135, 140, 145, 150, 155, 160, 165, 170, 175, or 180° C.)).

During the development of embodiments of the technology described herein, tests indicated that unfiltered, undiluted ADE from a digester comprises a % TS of approximately 2.5% to 3.5%. Is some of the experiments reported in Examples 1-4 to test candidate flocculants, a diluted ADE was used that comprised approximately 1% w/v solids. Thus, experiments were conducted during the development of embodiments of the technology described herein to test flocculants with undiluted ADE as it is produced from a digester.

During experiments testing flocculation of unfiltered, undiluted ADE (e.g., comprising a % TS of 2.5% to 3.5%) using an alginate flocculant, data were collected indicating that flocculating solids from ADE using alginate had a decreased efficiency for ADE comprising % TS more than 1%, e.g., approximately 2.5% or more. Accordingly, experiments were conducted to increase the flocculation ability of seaweed-based flocculants. In particular, it was surprisingly discovered that ADE could be "primed" for flocculation by adding a solution of sodium borate ($Na_3BO_3$) to the ADE prior adding the flocculant and, optionally, adding a coagulant and/or coflocculant. In the experiments, the ADE was heated to approximately 110 to 150° C. (e.g., to at least 110, 120, 130, 140, or 150° C.) while stirring. A stock solution of $Na_3BO_3$ was prepared using water sourced from the digester. Next, $Na_3BO_3$ stock solution was added to the heated ADE to provide a final borate concentration of at least 0.05% to 0.15% w/v (e.g., at least 0.05%, 0.06%, 0.07%, 0.08%, 0.09%, 0.10%, 0.11%, 0.12%, 0.13%, 0.14%, or 0.15% w/v). The resulting "primed" ADE was stirred and reacted with the borate for approximately 15 minutes (e.g., approximately 10, 11, 12, 13, 14, 15, 16, 17, 18, 19, or more minutes) prior to the addition of the alginate flocculant.

Without being limited by theory and with an understanding that the technology described herein can be practiced by one of ordinary skill in the art without a detailed description of the priming mechanism, it was contemplated that boron compounds (e.g., borate) provided during the priming step crosslinks organic molecules in the ADE to produce various branched structures comprising boron as the central atom.

The technology is not limited in the source of the boron (e.g., borate) used for the priming step. Accordingly, embodiments of methods provided herein comprise priming the ADE by adding sodium borate, boric acid, or other readily soluble boron (B) compounds in concentrations ranging from 0.025 to 0.25% w/v of the ADE mixture on a w/v basis (e.g., 0.025, 0.030, 0.035, 0.040, 0.045, 0.050, 0.055, 0.060, 0.065, 0.070, 0.075, 0.080, 0.085, 0.090, 0.095, 0.100, 0.105, 0.110, 0.115, 0.120, 0.125, 0.130, 0.135, 0.140, 0.145, 0.150, 0.155, 0.160, 0.165, 0.170, 0.175, 0.180, 0.185, 0.190, 0.195, 0.200, 0.205, 0.210, 0.215, 0.220, 0.225, 0.230, 0.235, 0.240, 0.245, or 0.250% w/v boron and/or borate). In some embodiments, the boron (e.g., borate) compound is added as a solid. In some embodiments, the boron (e.g., borate) compound is added in solution (e.g., at a concentration depending on the temperature of the water available for dissolution of the boron (e.g., borate) compound and/or considering a volume of boron (e.g., borate) solution to add to provide a desired dilution of ADE during the priming step). In some embodiments, the boron compound (e.g., borate) is added after a defibering step. In some embodiments, the boron compound is added 10 to 30 minutes (e.g., 10, 11, 12, 13, 14, 15, 16, 17, 18, 19, 20, 21, 22, 23, 24, 25, 26, 27, 28, 29, or 30 minutes) before adding other components (e.g., flocculant) to allow sufficient reaction time for producing branched organic molecules in the ADE. In some embodiments, the ADE is mixed, e.g., by agitation of the ADE as it transits through the pipes and other structures of a solids recovery system.

After the priming has been performed, embodiments of the methods comprise adding a flocculating agent (e.g., an alginate (e.g., an alginate prepared from a seaweed (e.g., a brown alga) as described herein)). In some embodiments of the present method, the flocculating agent is sodium alginate (e.g., Na-alginate), e.g., obtained from a commercial source. In some embodiments of the present method, the flocculating agent is prepared from a seaweed (e.g., a seaweed comprising a high concentration of alginate (e.g., a brown alga)) extracted in a NaOH solution, e.g., prepared by a method as described herein.

The Na alginate was added to the ADE to provide a concentration of approximately 0.2 to 0.5% w/v (e.g., approximately 0.20, 0.25, 0.30, 0.35, 0.40, 0.45, or 0.50) in the ADE. The flocculants comprise a high pH and a high sodium concentration. Accordingly, the sodium alginate flocculant preparation deprotonates carboxylic acid and other functional groups of the organic molecules in the ADE composition and saturates the deprotonated groups with $Na^+$. The $Na^+$ has a large hydrated radius that expands the electrical double layer around the negatively charged sites of the organic molecules in the ADE/flocculant preparation (both the branched borate-crosslinked organic molecules in the ADE and the alginate flocculant). Consequently, the alginate molecules (e.g., having a high molecular weight, a high charge, and a high length) interact and comingle with the organic molecules of the ADE and the entire mass of solids of the ADE is influenced by the flocculation action of the alginate in the subsequent step.

In some embodiments, methods comprise a step of adding $Ca^{2+}$ (e.g., $CaCl_2$) to the ADE/flocculant mixture as an activating agent. In some embodiments, the $Ca^{2+}$ is added to provide a concentration of approximately 3% (e.g., approximately 2.5 to 3.5% (e.g., 2.5, 2.6, 2.7, 2.8, 2.9, 3.0, 3.1, 3.2, 3.3, 3.4, 3.5% w/v)) in the ADE. In some embodiments, $Ca^{2+}$ is added to provide a concentration of approximately 1000 to 30000 ppm $Ca^{2+}$ (e.g., 500, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, 20000, 20500, 21000, 21500, 22000, 22500, 23000, 23500, 24000, 24500, 25000, 25500, 26000, 26500, 27000, 27500, 28000, 28500, 29000, 29500, or 30000 ppm or more than 30000 ppm).

While some embodiments comprise adding $CaCl_2$ to provide calcium, the technology is not limited to adding $CaCl_2$. Embodiments comprise adding any compound to provide soluble $Ca^{2+}$. The soluble $Ca^{2+}$ efficiently displaces the $Na^+$ ions from the negatively charged sites of the organic molecules. This replacement of $Na^+$ by $Ca^{2+}$ has two main effects: a) compressing the diffuse electrical double layer around the negatively charged sites of the organic molecules in the ADE/flocculant preparation (both the branched borate-crosslinked organic molecules in the ADE and the alginate flocculant) due to $Ca^{2+}$ having a smaller hydrated radius than $Na^+$; and b) producing bridging between negative sites on the organic molecules in the ADE/flocculant preparation, thus promoting the folding of single molecules and binding of independent molecules into a matrix of molecules that quickly coalesce into large flocs of organic matter comprising organic molecules from the ADE, alginate, and other organics present in the alginate and algae extracts. Thus, the cation is not limited to calcium ion; accordingly, embodiments comprise adding other monovalent and/or divalent and/or trivalent cations that compresses the electrical double layer around the negatively charged sites of the organic molecules in the ADE/flocculant preparation and/or that promotes folding of organic molecules to coalesce into large flocs of organic matter. The large flocs are separated from the liquid by settling using gravity, floating using dissolved air bubbles, or other separation techniques to provide an efficient solid-liquid separation. The technology provides for the harvesting of the solids from the ADE in a manner that meets National Organic Program and other organic agriculture standards such as those applied by the Organic Materials Research Institute.

Example 8

Testing Flocculants with ADE Priming

During the development of embodiments of the technology described herein, experiments were conducted to test flocculant activity in ADE and primed ADE. In particular, candidate flocculants were screened for flocculant activity using ADE comprising solids at concentrations ranging from 2.5%-3.5% (w/v) and a range of concentrations of candidate materials (e.g., from 0 ppm to approximately 3000 ppm). Some flocculants were tested at higher concentrations (e.g., up to 4%). After addition of flocculant to the ADE, the flocculation test samples were mixed at 100 rpm. Some flocculants were tested with a coflucculant (e.g., an ions (e.g., cations (e.g., $Ca^{2+}$))). Some flocculants were tested with primed ADE (e.g., ADE comprising a primer (e.g., borate (e.g., sodium borate)). When a coflocculant was used in a test, the coflocculant was added after addition of the flocculant and the combination was mixed for 5 minutes at 100 rpm. After mixing, the flocculation tests were permitted to settle for at least 1 hour. A conventional polyacrylamide flocculant (e.g., Tramfloc) was used as a positive control. After settling, the flocculation tests were backlit and the opacity of the test reactions was measured. In addition, the height of the settled material was measured. For some samples, aliquots of the supernatant were collected to measure total dissolved solids (TDS) and turbidity. TDS measurements were conducted using a Sartorius MA35 moisture meter. Briefly, 2 g of supernatant solution were placed on an aluminum tray fitted with a fiberglass absorbent pad. The sample on the tray was heated at 100 degrees C. and the percent TDS was automatically calculated using an integrated declining weight balance. Turbidity was measured using a Hach TL2360 Turbidimeter. Due to the high turbidity of untreated ADE controls, all samples were diluted before readings were made. The effectiveness of any particular treatment as a flocculant was calculated using the measured turbidity as:

$$\log_{10} \text{control/treatment}$$

where 'control' was the turbidity value measure for untreated ADE and 'treatment' is the turbidity value measured for the test sample. To account for variability in ADE samples, each analysis was normalized to Tramfloc. The ADE tested in these experiments was from an actual digester and was "richer" than most wastewater streams. Accordingly, data collected during the experiments described herein (e.g., use of flocculant on actual ADE) indicated that many flocculants commonly used in water treatment performed differently in the experiments reported herein than previously reported.

Figure 6:
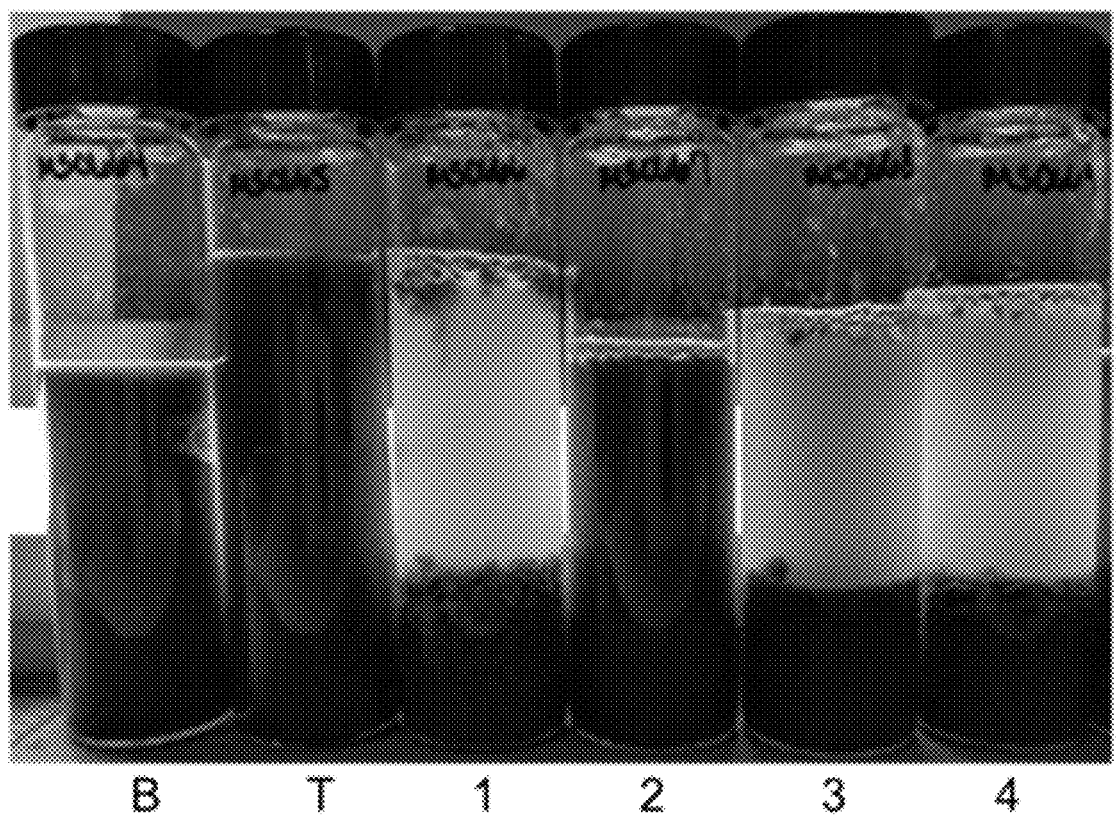
FIG. 6 is a photograph of samples used to test the effectiveness of alginate flocculants used with a borate primer to flocculate ADE. All vials contained ADE comprising 2.5% solids w/v and primed with 1000 ppm $Na_3BO_3$. The alginate flocculants tested were prepared from the indicated brown alga species using NaOH as described herein. Mesh sizes indicate the size of the ground seaweed used to prepare the flocculant by treatment with NaOH. Vial B—ADE blank (no-flocculant negative control); Vial T—25 ppm Tramfloc; Vial 1—2264 ppm *M. pyrifera* flocculant (50 mesh) and 18868 ppm $CaCl_2$; Vial 2—2667 ppm *A. nodosum* flocculant (50 mesh) and 4444 ppm $CaCl_2$; Vial 3—2553 ppm *A. nodosum* flocculant (50 mesh) and 8511 ppm $CaCl_2$; Vial 4—2449 ppm *A. nodosum* flocculant (50 mesh) and 12245 ppm $CaCl_2$.
Figure 7:
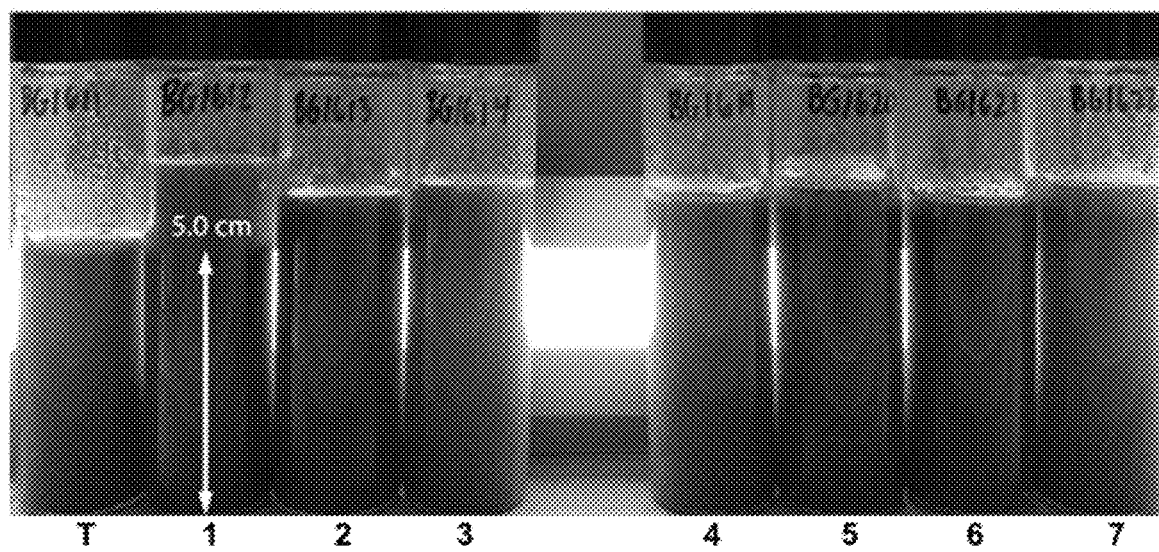
FIG. 7 is a photograph of samples used to test the effectiveness of alginate flocculants to produce floc solids from ADE comprising 2.5% w/v solids in the absence of a borate primer (e.g., primer-free ADE). The alginate flocculants tested were prepared from the indicated brown alga species using NaOH as described herein. Mesh sizes indicate the size of the ground seaweed used to prepare the flocculant by treatment with NaOH. Vial T—25 ppm Tramfloc; Vial 1—2353 ppm *M. pyrifera* flocculant (50 mesh) and 19608 ppm $CaCl_2$; Vial 2—2667 ppm *M. pyrifera* flocculant (50 mesh) and 8889 ppm $CaCl_2$; Vial 3—2553 ppm *M. pyrifera* flocculant (50 mesh) and 12766 ppm $CaCl_2$; Vial 4—2667 ppm *A. nodosum* flocculant (25 mesh) and 8889 ppm $CaCl_2$; Vial 5—2553 ppm *A. nodosum* flocculant (25 mesh) and 12766 ppm $CaCl_2$; Vial 6—2667 ppm *A. nodosum* flocculant (50 mesh) and 8889 ppm $CaCl_2$; Vial 7—2553 ppm *A. nodosum* flocculant (50 mesh) and 12766 ppm $CaCl_2$.

Data collected during these experiments indicated that flocculation of solids from ADE using seaweed flocculant and $CaCl_2$ was more efficient using ADE treated (e.g., primed) with a boron (e.g., borate) primer than for ADE that was not treated with a boron (e.g., borate) primer. See, e.g., FIG. 6 and FIG. 7.

Example 9

Nutrient Profiles

During the development of embodiments of the technology described herein, experiments were conducted to measure nutrient profiles of ADE prior to treatment with a flocculant and after treatment with alga-derived (e.g., alginate) flocculants. Flocculants tested were: 1) Tramfloc as a control; 2) borate primer, *A. nodosum* flocculant (e.g., produced using NaOH as described herein), and calcium ion; and 3) borate primer, *M. pyrifera* flocculant (e.g., produced using NaOH as described herein), and calcium ion. The following materials were used in these experiments:

1000 mL defibered ADE collected from digester and comprising 2.5% floc solids
  4% *M. pyrifera* stock in a 1% NaOH solution, diluted from 8% *M. pyrifera* extracted for 8-16 hours in a 2% NaOH solution
  4% *A. nodosum* stock in a 1% NaOH solution, diluted from 8% *A. nodosum* extracted for 8-16 hours in a 2% NaOH solution
  10% $Na_3BO_3$ stock solution
  10% $CaCl_2$ stock solution
  0.1% (1000 ppm) stock Tramfloc solution Floc solids were produced from ADE using alginate flocculants (e.g., produced from brown algae as described herein). A volume of 1000 mL of ADE was heated and stirred (e.g., using a magnetic stir bar) at approximately 100 rpm in a glass beaker to 120-130 degrees F. (e.g., on a heated magnetic stir plate). Once heated, 10 mL of a 10% concentrated $Na_3BO_3$ solution was added to the ADE to provide a 0.1% borate-primed ADE. The primed ADE was reacted with the borate primer for 15 minutes with stirring at approximately 100 rpm and at 120-130 degrees F. After 15 minutes, 79 mL of either *M. pyrifira* or *A. nodosum* stock seaweed extract solution (e.g., alginate flocculant prepared from *M. pyrifera* or *A. nodosum* as described herein) was added to the primed ADE to produce an alginate concentration of 2683 ppm for the *M. pyrifera* flocculant or 2534 ppm for the *A. nodosum* flocculant. 158 mL of a 10% w/v $CaCl_2$ stock solution was added to the ADE immediately following addition of the stock seaweed extraction solution. The resulting solution was mixed thoroughly before removing from heat and allowed to sit undisturbed for 60 minutes so that complete flocculation occurred. After 60 minutes, the resultant flocculated solids and supernatant were poured directly through a mesh bag made of organza fabric attached to a bucket to separate the solids from the supernatant. Remaining solids in the beaker were scraped using a rubber spatula into the mesh bag. The solids were allowed to drain via gravity into the bucket for approximately 30-60 minutes to remove as much residual moisture from the solids as possible without destroying the structure of the solids. A minimum of 100 g of flocculated solids was collected and sent to an independent laboratory for nutrient analysis, summarized in Table 10 below.

As a control, floc solids were produced from ADE using Tramfloc. A volume of 1000 mL of ADE was heated and stirred (e.g., using a magnetic stir bar) at approximately 100 rpm in a glass beaker to 120-130 degrees F. (e.g., on a heated magnetic stir plate). Once heated, 34 mL of stock Tramfloc solution was added to the ADE to provide a Tramfloc concentration of 25 ppm, which was immediately followed by adding 334 mL of water. The resulting solution was mixed thoroughly before removing from heat and allowed to sit undisturbed for 60 minutes so that complete flocculation occurred. After 60 minutes, the resultant flocculated solids and supernatant wore poured directly through a mesh bag made of organza fabric attached to a bucket separate the solids from the supernatant. Remaining solids in the beaker were scraped using a rubber spatula into the mesh bag. The solids were allowed to drain via gravity into the bucket for approximately 30-60 minutes to remove as much residual moisture from the solids as possible without destroying the structure of the solids. A minimum of 100 g of flocculated solids was collected and sent to an independent laboratory for nutrient analysis, summarized in Table 10 below.

A minimum of 100 mL of untreated ADE was also collected and sent to an independent laboratory for nutrient analysis, summarized in Table 9 below. Further, multiple defibered ADE samples were taken over a period of 2 years and tested for boron. The lab data characterizing the defibered ADE samples indicated that the ADE did not comprise detectable boron in any sample tested.

Table 9 shows the nutrient profile of an untreated test ADE prior to treatment with alginate and primer (e.g., borate) and that was subsequently used to test flocculation by treatment with alginate and primer (e.g., borate). Table 10 shows the nutrient profile of floc solids produced from: 1) the test ADE using 25 ppm Tramfloc; 2) the nutrient profile of floc solids produced from the test ADE using 1000 ppm $Na_3BO_3$ primer, 2534 ppm *A. nodosum* flocculant (e.g., produced using NaOH as described herein), and 12,670 ppm $CaCl_2$; and 3) the nutrient profile of floc solids produced from the test ADE using 1000 ppm $Na_3BO_3$ primer, 2683 ppm *M. pyrifera* flocculant (e.g., produced using NaOH as described herein), and 12,619 ppm $CaCl_2$.

Floc solids produced using Tramfloc did not comprise boron (e.g., essentially and/or substantially no boron (e.g., boron-free)) and/or comprised an undetectable amount of boron.

The data indicated that alginates extracted from borate-primed ADE using *A. nodosum* and *M. pyrifera* at high concentrations and calcium chloride captured similar or greater amounts of desirable nutrients (e.g., total N, P, K, S, Ca, Mg, Mn, Cu, Zn) than a conventional polyacrylamide flocculant (e.g., TramFloc). In some embodiments, minimizing the dose while maintaining high capture efficiencies provides a greater economic benefit of this process.

TABLE 9

Nutrient profile of Test ADE prior to flocculation

| | Unit | Nutrient or other characterization |
| --- | --- | --- |
| Ammoniacal N | mg/L | 1160 |
| Organic N | mg/L | 730 |
| Total Kjeldahl N (TKN) | mg/L | 1890 |
| P as $P_2O_5$ | mg/L | 547 |
| K as $K_2O$ | mg/L | 1770 |
| S | mg/L | 151 |
| Ca | mg/L | 1080 |
| Mg | mg/L | 534 |
| Na | mg/L | 733 |
| Fe | mg/L | 62.4 |
| Mn | mg/L | 11.54 |
| Zn | mg/L | 12 |
| Cu | mg/L | 9.4 |
| Conductivity | mS/cm | 12.5 |
| pH | S.U. | 8.27 |
| Loss on Ignition (OM) | % | 1.6 |
| Total Organic Carbon (TOC) | mg/L | 1480 |
| Percent Solids | % | 2.43 |

TABLE 10

Nutrient capture from ADE with alginates

| Treatment | TramFloc (25 ppm) | $Na_3BO_3$ (1000 ppm) A. nodosum (2534 ppm) $CaCl_2$ (12,670 ppm) | $Na_3BO_3$ (1000 ppm) M. pyrifera (2683 ppm) $CaCl_2$ (12,619 ppm) |
| --- | --- | --- | --- |
| Total N | 25% | 29% | 28% |
| Organic N | 39% | 60% | 55% |
| Ammonium N | 17% | 10% | 11% |
| Total $P_2O_5$ | 82% | 84% | 86% |
| P, total | 82% | 84% | 86% |
| Total $K_2O$ | 14% | 12% | 14% |
| K, total | 14% | 12% | 14% |
| Sulfur, total | 71% | 97% | 84% |

TABLE 10-continued

Nutrient capture from ADE with alginates

| Treatment | TramFloc (25 ppm) | Na$_3$BO$_3$ (1000 ppm) A. nodosum (2534 ppm) CaCl$_2$ (12,670 ppm) | Na$_3$BO$_3$ (1000 ppm) M. pyrifera (2683 ppm) CaCl$_2$ (12,619 ppm) |
|---|---|---|---|
| Calcium, total | 97% | 300%* | 311%* |
| Magnesium, total | 61% | 38% | 41% |
| Sodium, total | 15% | 21% | 21% |
| Manganese, total | 87% | 87% | 89% |
| Copper, total | 76% | 90% | 89% |
| Zinc, total | 78% | 90% | 91% |
| Iron, total | 100% | 98% | 98% |
| Carbon, Total | 54% | 45% | 46% |

*Calcium levels in the alginate extractions are above 100% relative to the input ADE due to the addition of calcium chloride to activate the alginate.

REFERENCES CITED IN THE EXAMPLES

1. Piazza et al., Identification of highly active flocculant proteins in bovine blood. Appl Biochem Biotechnol, 2012. 166(5): p. 1203-14.
2. Piazza et al., Flocculation of high purity wheat straw soda lignin. Bioresour Technol, 2014. 152: p. 548-51.
3. Piazza and Garcia, Methods for flocculating suspensions using biobased renewable flocculants, USPTO, Editor. 2012.
4. Piazza and Garcia, Meat & bone meal extract and gelatin as renewable flocculants. Bioresour Technol, 2010. 101(2): p. 781-7.
5. Piazza and Garcia, Proteins and peptides as renewable flocculants. Bioresource Technology, 2010. 101(15): p. 5759-5766.
6. Essandoh et al., Methylation of hemoglobin to enhance flocculant performance. Journal of Chemical Technology & Biotechnology, 2017. 92(8): p. 2032-2037.
7. Ahlrichs et al., Interaction of Ammonia with Vermiculite. Clay Minerals, 1972. 9: p. 263-274.
8. Burgess et al., Use of zeolite for removing ammonia and ammonia-caused toxicity in marine toxicity identification evaluations. Arch Environ Contam Toxicol, 2004. 47(4): p. 440-7.
9. Evangelou, and Lumbanraja, Ammonium-Potassium-Calcium Exchange on Vermiculite and Hydroxy-aluminum Vermiculite. Soil Sci. Soc. Am. J, 2002. 66: p. 445-455.
10. Goto et al., Ion exchange behavior of ammonium ions on various zeolites.
11. Nguyen and Tanner, Ammonium removal from waste waters using natural New Zeland zeolites. New Zealand Journal of Agricultural Research, 1998. 41: p. 427-446.
12. Scott et al., Ammonia-treated Vermiculite—an Efficient Controlled-release Nitrogenous Fertiliser for a Variety of Crops. J Sci. Food Agric., 1983. 34: p. 233-238.
13. Wen et al., Biodegradation of polyacrylamide by bacteria isolated from activated sludge and oil-contaminated soil. J Hazard Mater, 2010. 175(1-3): p. 955-9.
14. Pawar and Edgar, Alginate derivatization: A review of chemistry, properties and applications. Biomaterials, 2012. 33: p. 3279-3305.
15. McHugh, ed. Production and Utilization of Products from Commercial Seaweeds. FAO Fisheries Technical Paper. 1987, Food and Agriculture Organization of the United Nations: Rome.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method of producing an organic fertilizer, the method comprising:
   a) producing organic floc solids from anaerobic digester effluent, the producing including:
      priming the anaerobic digester effluent by adding a primer comprising boron to the anaerobic digester effluent to form a primed anaerobic digester effluent,
      adding a flocculant to the primed anaerobic digester effluent, and
      adding an activating agent comprising a cation to a mixture of the primed anaerobic digester effluent and the flocculant;
   b) separating the organic floc solids from the anaerobic digester effluent; and
   c) producing the organic fertilizer from the separated organic floc solids by one or both of granulating the organic floc solids and pelletizing the organic floc solids to produce the organic fertilizer.

2. The method of claim 1, further comprising:
   prior to adding the flocculant to the primed anaerobic digester effluent, producing the flocculant, wherein the producing the flocculant includes adding an alginate-producing plant to a basic solution.

3. The method of claim 2, wherein the alginate-producing plant includes a brown alga.

4. The method of claim 2, wherein the basic solution comprises 1% to 4% w/v NaOH.

5. The method of claim 2, further comprising:
   prior to adding the flocculant, heating the anaerobic digester effluent to a temperature in a range of 110° C. to 150° C. and stirring the anaerobic digester effluent.

6. The method of claim 1, further comprising:
   adding a binder to the organic floc solids.

7. The method of claim 1, further comprising:
   adding a filler to the organic floc solids.

8. The method of claim 1, further comprising:
   adding a binder and a filler to the organic floc solids.

9. The method of claim 1, further comprising:
incubating the organic floc solids to degrade the flocculant.

10. The method of claim 1, further comprising:
dewatering a pelletized fertilizer that comprising the produced organic fertilizer.

11. The method of claim 1, further comprising:
dewatering a granulated fertilizer that comprises the produced organic fertilizer.

12. The method of claim 1, wherein the organic floc solids produced from the anaerobic digester effluent are National Organic Program (NOP)-compliant.

13. The method of claim 1, wherein the produced organic fertilizer is National Organic Program (NOP) compliant.

14. The method of claim 1, wherein the cation includes $Ca^{2+}$.

15. The method of claim 1, wherein the cation includes 2.5% to 3.5% w/v $Ca^{2+}$.

16. The method of claim 1, wherein the flocculant includes an alginate.

17. The method of claim 1, wherein the flocculant includes 0.2 to 0.5% w/v alginate.

18. The method of claim 1 wherein the primer includes a borate.

19. The method of claim 1, wherein the primer includes 0.025 to 0.25% w/v borate.

20. The method of claim 1, wherein said primer is added at least 10 minutes before said flocculant.

* * * * *

SEQUENCE LISTING

```
<160> NUMBER OF SEQ ID NOS: 2

<210> SEQ ID NO 1
<211> LENGTH: 142
<212> TYPE: PRT
<213> ORGANISM: Homo sapiens

<400> SEQUENCE: 1

Met Val Leu Ser Pro Ala Asp Lys Thr Asn Val Lys Ala Ala Trp Gly
1               5                   10                  15

Lys Val Gly Ala His Ala Gly Glu Tyr Gly Ala Glu Ala Leu Glu Arg
            20                  25                  30

Met Phe Leu Ser Phe Pro Thr Thr Lys Thr Tyr Phe Pro His Phe Asp
        35                  40                  45

Leu Ser His Gly Ser Ala Gln Val Lys Gly His Gly Lys Lys Val Ala
```

```
                50                  55                  60
Asp Ala Leu Thr Asn Ala Val Ala His Val Asp Asp Met Pro Asn Ala
 65                  70                  75                  80

Leu Ser Ala Leu Ser Asp Leu His Ala His Lys Leu Arg Val Asp Pro
                 85                  90                  95

Val Asn Phe Lys Leu Leu Ser His Cys Leu Leu Val Thr Leu Ala Ala
                100                 105                 110

His Leu Pro Ala Glu Phe Thr Pro Ala Val His Ala Ser Leu Asp Lys
            115                 120                 125

Phe Leu Ala Ser Val Ser Thr Val Leu Thr Ser Lys Tyr Arg
            130                 135                 140

<210> SEQ ID NO 2
<211> LENGTH: 147
<212> TYPE: PRT
<213> ORGANISM: Homo sapiens

<400> SEQUENCE: 2

Met Val His Leu Thr Pro Glu Glu Lys Ser Ala Val Thr Ala Leu Trp
 1               5                  10                  15

Gly Lys Val Asn Val Asp Glu Val Gly Gly Glu Ala Leu Gly Arg Leu
                20                  25                  30

Leu Val Val Tyr Pro Trp Thr Gln Arg Phe Phe Glu Ser Phe Gly Asp
             35                  40                  45

Leu Ser Thr Pro Asp Ala Val Met Gly Asn Pro Lys Val Lys Ala His
         50                  55                  60

Gly Lys Lys Val Leu Gly Ala Phe Ser Asp Gly Leu Ala His Leu Asp
 65                  70                  75                  80

Asn Leu Lys Gly Thr Phe Ala Thr Leu Ser Glu Leu His Cys Asp Lys
                 85                  90                  95

Leu His Val Asp Pro Glu Asn Phe Arg Leu Leu Gly Asn Val Leu Val
                100                 105                 110

Cys Val Leu Ala His His Phe Gly Lys Glu Phe Thr Pro Pro Val Gln
            115                 120                 125

Ala Ala Tyr Gln Lys Val Val Ala Gly Val Ala Asn Ala Leu Ala His
            130                 135                 140

Lys Tyr His
145
```